United States Patent
Mora et al.

(10) Patent No.: US 12,388,974 B2
(45) Date of Patent: *Aug. 12, 2025

(54) METHOD FOR IMAGE PROCESSING AND APPARATUS FOR IMPLEMENTING THE SAME

(71) Applicant: ATEME, Velizy Villacoublay (FR)

(72) Inventors: Elie Mora, Malakoff (FR); Mohsen Abdoli, Rennes (FR); Thomas Guionnet, Rennes (FR)

(73) Assignee: ATEME, Velizy Villacoublay (FR)

( * ) Notice: Subject to any disclaimer, the term of this patent is extended or adjusted under 35 U.S.C. 154(b) by 14 days.

This patent is subject to a terminal disclaimer.

(21) Appl. No.: 17/946,442

(22) Filed: Sep. 16, 2022

(65) Prior Publication Data
US 2023/0009360 A1   Jan. 12, 2023

Related U.S. Application Data

(63) Continuation of application No. 16/815,567, filed on Mar. 11, 2020, now Pat. No. 11,451,768.

(30) Foreign Application Priority Data

Mar. 12, 2019   (EP) .................................. 19305293

(51) Int. Cl.
*H04N 19/103* (2014.01)
*G06F 17/16* (2006.01)
(Continued)

(52) U.S. Cl.
CPC ........... *H04N 19/103* (2014.11); *G06F 17/16* (2013.01); *G06N 7/01* (2023.01); *G06T 7/11* (2017.01);
(Continued)

(58) Field of Classification Search
CPC .... H04N 19/103; H04N 19/196; H04N 19/14; H04N 19/157; H04N 19/136;
(Continued)

(56) References Cited

U.S. PATENT DOCUMENTS 8,559,512 B2   10/2013   Paz
9,955,171 B2   4/2018   Tsukuba et al.
(Continued)

FOREIGN PATENT DOCUMENTS

| EP | 2 375 750 A1 | | 10/2011 |
|---|---|---|---|
| KR | 10-2018-0069606 | * | 6/2018 |
| WO | 2013/067435 A1 | | 5/2013 |

OTHER PUBLICATIONS

Bross et al., "High Efficiency Video Coding (HEVC) text specification draft 7," Document JCTVC-I1003, JCT-VC of ITU-T SG16 WP3 and ISO/IEC JTC1/SC29/WG11, 9th Meeting, Geneva, CH, Apr. 27-May 7, 2012, 280 pages.
(Continued)

*Primary Examiner* — Richard A Hansell, Jr.
(74) *Attorney, Agent, or Firm* — Faegre Drinker Biddle & Reath LLP

(57) ABSTRACT

A method of processing an image divided into a plurality of pixel blocks which are processed according to a processing sequence is provided, which comprises, for a current pixel block: determining an application area comprising a set of pixels in blocks preceding the current block in the processing sequence; performing a gradient analysis on at least one pixel of the application area; selecting at least two intra prediction video coding modes among a plurality of intra prediction video coding modes usable for processing the current pixel block, wherein at least one of the selected intra prediction video coding modes is selected based on the gradient analysis; determining a plurality of predictors of the current pixel block based on the at least two selected intra
(Continued)

prediction video coding modes; and generating a predictor of the current pixel block based on the determined plurality of predictors.

20 Claims, 14 Drawing Sheets

(51) Int. Cl.
    *G06N 7/01*     (2023.01)
    *G06T 7/11*     (2017.01)
    *G06T 7/90*     (2017.01)

(52) U.S. Cl.
    CPC ...... *G06T 7/90* (2017.01); *G06T 2207/10016* (2013.01)

(58) Field of Classification Search
    CPC .... H04N 19/176; H04N 19/593; H04N 19/11; H04N 19/105; G06F 17/16; G06N 7/01; G06T 7/11; G06T 7/90; G06T 2207/10016
    See application file for complete search history.

(56) References Cited

U.S. PATENT DOCUMENTS

| | | | |
|---|---|---|---|
| 10,448,011 | B2 | 10/2019 | Liu et al. |
| 2012/0170652 | A1* | 7/2012 | Guo ............... H04N 19/176 375/E7.243 |
| 2012/0269263 | A1 | 10/2012 | Bordes et al. |
| 2012/0314766 | A1 | 12/2012 | Chien et al. |
| 2015/0016521 | A1 | 1/2015 | Peng et al. |
| 2015/0172719 | A1* | 6/2015 | Guo ............... H04N 19/11 375/240.12 |
| 2016/0014421 | A1* | 1/2016 | Cote ............... H04N 19/14 382/170 |
| 2017/0272745 | A1* | 9/2017 | Liu ............... H04N 19/157 |
| 2017/0353730 | A1* | 12/2017 | Liu ............... H04N 19/159 |
| 2017/0366807 | A1 | 12/2017 | Thoreau et al. |
| 2017/0374369 | A1* | 12/2017 | Chuang ............... H04N 19/70 |
| 2018/0176582 | A1* | 6/2018 | Zhao ............... H04N 19/51 |
| 2018/0310001 | A1* | 10/2018 | Choi ............... H04N 19/176 |
| 2019/0020888 | A1 | 1/2019 | Liu et al. |
| 2019/0158828 | A1* | 5/2019 | Chang ............... H04N 19/11 |
| 2019/0166370 | A1* | 5/2019 | Xiu ............... H04N 19/176 |
| 2019/0174128 | A1* | 6/2019 | Jang ............... H04N 19/119 |
| 2019/0208198 | A1 | 7/2019 | Pettersson et al. |
| 2019/0281290 | A1* | 9/2019 | Lee ............... H04N 19/119 |
| 2019/0335199 | A1 | 10/2019 | Joshi et al. |
| 2020/0045311 | A1* | 2/2020 | Yoo ............... H04N 19/159 |
| 2020/0045322 | A1* | 2/2020 | Ye ............... H04N 19/11 |
| 2020/0145668 | A1* | 5/2020 | Kotra ............... H04N 19/119 |
| 2020/0228800 | A1 | 7/2020 | Joshi et al. |
| 2021/0274214 | A1* | 9/2021 | Moon ............... H04N 19/46 |
| 2023/0262223 | A1* | 8/2023 | Ghaznavi Youvalari ............... H04N 19/159 375/240.02 |

OTHER PUBLICATIONS

Chen et al., "Algorithm Description of Joint Exploration Test Model 7 (JEM 7)," Document JVET-G1001-v1, JVET of ITU-T SG16 WP3 and ISO/IEC JTC1/SC29/WG11, 7th Meeting, Torino, IT, Jul. 13-21, 2017, 50 pages.

Cisco Corp., "Cisco Visual Networking Index: Global Mobile Data Traffic Forecast Update, 2017-2022," White Paper, 2017, updated Feb. 2019, downloaded from Internet website: https://www.cisco.com/c/en/us/solutions/collateral/service-provider/visual-networking-index-vni/white-paper-c11-738429.html on Sep. 26, 2019, 33 pages.

Jiang et al., "Gradient Based Fast Mode Decision Algorithm for Intra Prediction in HEVC," 2012 2nd International Conference on Consumer Electronics, Communications and Networks (CECNET), IEEE, Apr. 21, 2012, pp. 1836-1840.

Kau et al., "A Gradient Intensity-Adapted Algorithm With Adaptive Selection Strategy for the Fast Decision of H.264/AVC Intra-Prediction Modes," IEEE Transactions on Circuits and Systems for Video Technology, Jun. 2015, vol. 25, No. 6, pp. 944-657.

Mora et al., "CE3-related: Decoder-side Intra Mode Derivation," Document JVET-L0164, JVET of ITU-T SG16 WP3 and ISO/IEC JTC1/SC29/WG11, 12th Meeting, Macao, CN, Oct. 3-12, 2018, 8 pages.

Mora et al., "CE3: Decoder-side Intra Mode Derivation (tests 3.1.1, 3.1.2., 3.1.3 and 3.1.4)," Document JVET-M0094, JVET of ITU-T SG16 WP3 and ISO/IEC JTC1/SC29/WG11, 13th Meeting, Marrakech, MA, Jan. 9-18, 2019, 7 pages.

Pan et al., "Fast Mode Decision Algorithm for Intraprediction in H.264/AVC Video Coding," IEEE Transactions on Circuits and Systems for Video Technology, Institute of Electrical and Electronics Engineers, US, Jul. 2005, vol. 15, No. 7, pp. 813-822.

Ramezanpour et al., "Fast HEVC I-frame coding based on strength of dominant direction of CUs," Journal of Real-Time Image Processing, Springer, DE, vol. 12(2), Mar. 30, 2016, pp. 397-406.

Su et al., "An Optimized Template Matching Approach to Intra Coding in Video/Image Compression," Proceedings of SPIE-IS&T Electronic Imaging, SPIE vol. 9029, 2014, pp. 902904-1-902904-6.

Xiu et al., "EE8: Decoder-side intra mode derivation," Document JVE-D0097, JVET of ITU-T SG16 WP3 and ISO/IEC JTC1/SC29/WG11, 4th Meeting, Chengdu, CN, Oct. 15-21, 2016, 7 pages.

Search Report issued in European patent application EP 19305293.3, Jul. 15, 2019, 4 pages.

Search Report issued in European patent application EP 18306269.4, Apr. 1, 2019, 10 pages.

\* cited by examiner

METHOD FOR IMAGE PROCESSING AND APPARATUS FOR IMPLEMENTING THE SAME

CROSS-REFERENCE TO RELATED APPLICATIONS

This application is a continuation of U.S. patent application Ser. No. 16/815,567, filed Mar. 11, 2020, now U.S. Pat. No. 11,451,768, which claims priority benefit under 35 U.S.C. § 119(d) from European Patent Application No. 19 305 293.3, filed Mar. 12, 2019, the disclosures of all are incorporated by reference herein in their entirety.

FIELD

The present disclosure relates to the field of image encoding, in particular for video stream compression.

BACKGROUND

Video data is often source encoded so as to decrease the amount of resources necessary for its transmission and/or storage in memory. Various video coding or compression standards that have been developed over the recent years, such as H.264/AVC, H.265/HEVC or MPEG-2, may be used for that purpose.

In known video coding or compression schemes, images (also referred to as "frames") of an input video stream to be encoded are typically processed according to an image encoding sequence, and each image is divided into pixel sets (also referred to as, depending on the scheme, "blocks" or "coding unit") which are also processed sequentially, for example starting from the set located in the upper left corner of the image, and ending with the set located in the lower right corner of the image.

The encoding of an image of an input video stream may therefore involve dividing a pixel matrix corresponding to the image into several pixel sets, for example into blocks of a fixed size (16×16 pixels, 32×32 pixels, or 64×64 pixels), and encoding these pixel blocks according to a predefined encoding sequence. In some standards, such as H.264/AVC, blocks smaller than 16×16 pixels may be defined (for example of size 8×8 pixels or 4×4 pixels) so as to perform encoding of the image with a finer granularity.

Conventional video compression schemes can be classified into two main categories: an intra prediction video coding category on the one hand, and an inter prediction video coding category on the other hand. In intra prediction video coding, also referred to as spatial prediction video coding, the compression processing uses for the prediction spatial redundancies based on pixels of the current image or video frame, while in inter prediction video coding, also referred to as temporal prediction video coding, the compression processing uses for the prediction temporal redundancies based on pixels of several images or video frames (previously encoded and reconstructed video frames, which may correspond to previous and/or future frames with respect to a current frame in an input video sequence). More specifically, in intra prediction video coding, the processing of a pixel block (or set of pixels) typically includes a prediction of the pixels of the block based on reconstructed pixels that have been previously encoded (also called "causal pixels") in the image currently being encoded (which may be referred to as "current image"). In inter prediction video coding, the processing of a pixel block typically includes a prediction of the pixels of the block based on pixels of one or more previously encoded images.

Exploiting the spatial redundancies (for intra prediction video coding) and/or time redundancies (for inter prediction video coding) is therefore performed to avoid transmitting or storing the pixel values of each pixel block (or set of pixels), and at least some of the blocks of each encoded image in a video stream is represented by a pixel residual that corresponds to the difference (or the distance) between prediction values and true values for the pixels of the predicted block. Information related to pixel residual is inserted in the encoded data generated by a video encoder after transform (e.g. Discrete Cosinus Transform, DCT) and quantization so as to reduce the entropy of data generated by the encoder.

In 2013, the video compression standard High Efficiency Video Coding (HEVC)/H.265 reached Final Draft International Standard (FDIS) status. This standard was developed by the Joint Collaborative Team on Video Coding (JCT-VC), a collaboration between two standardization bodies ISO/IEC MPEG and ITU-T VCEG. HEVC is the successor of the H.264/AVC (Advance Video Coding) standard, which is widely used nowadays (around 90% videos are still coded with AVC). HEVC brings improvements compared to AVC, offering double the data compression ratio at the same level of video quality, or substantially improved video quality at the same bit rate.

The visualization of video content has been revolutionized in the last few years with the emergence of video-on-demand services like YouTube, Netflix, Hulu, etc. web-TV, video-sharing sites, social networks like Facebook, Instagram, Snapchat etc., or live video streaming service for individuals. All of the above-mentioned services are rapidly increasing the internet video traffic. In addition, video data is getting larger and there is a constant need to compress it, but without significantly degrading the quality of the video. Some research predicts that by the year 2021, the video traffic will increase by 4 times since 2016 and the amount of data will probably represent around 81% of all internet traffic. New technologies like 360° videos, Virtual Reality, HD videos, UHD videos, 4K, 8K or 16K videos yield significantly more data to transmit.

As a result, a Joint Video Experts Team (JVET)—a collaborative team formed by the same standardization bodies MPEG and VCEG—has been created with an aim to develop a new video coding standard to be known as Versatile Video Coding—VVC/H.266. The primary objective of this new codec is to provide a significant improvement in compression performance over HEVC. The VVC standard is scheduled to be released in 2021 and by then, the aim is not just to lower the bitrate at the same video quality, but also to develop a codec which would aid the deployment of higher quality video services and emerging applications such as 360° omnidirectional immersive multimedia and High Dynamic Range (HDR) video.

In conventional encoding standards using prediction coding, additional information is generated by pixel prediction. Its corresponding data (also called prediction information) is inserted in the output data generated by the encoder. In the intra coding mode, the intra prediction mode defining how the prediction of the current block is performed using neighboring samples (which may be referred to as "reference samples"), is an example of such prediction information. For intra prediction coding, an estimate of between 4% and 15% of the bit stream at the output of a video encoder may correspond to data to be provided to a decoder for information related to pixel prediction used to encode the input video stream. Therefore it is desirable to improve the efficiency of video encoding/compression by decreasing the amount of data generated at the output of the encoder and corresponding to pixel prediction information (such as, for example, intra prediction modes, or motion vectors), while preserving performance of the encoder (encoding gain).

There is therefore a need for providing an improved video processing scheme and video encoder and/or decoder implementing the same that address at least some of the above-described drawbacks and shortcomings of the conventional technology in the art.

It is an object of the present subject disclosure to provide an improved video processing scheme and apparatus implementing the same.

Another object of the present subject disclosure is to provide an improved video encoding or compression and/or video decoding or decompression scheme and apparatuses implementing the same.

Another object of the present subject disclosure is to provide an improved video encoding and/or decoding scheme and apparatuses implementing the same for alleviating the above-described drawbacks and shortcomings of conventional prediction-based video encoding/decoding schemes, in particular video encoding/decoding schemes using intra prediction encoding of pixel blocks of images of an input video stream to be encoded.

SUMMARY

To achieve these objects and other advantages and in accordance with the purpose of the present subject disclosure, as embodied and broadly described herein, in one aspect of the present subject disclosure, a method of processing an image, a digital video frame, or more generally digital video data, divided into a plurality of pixel blocks which are processed according to a processing sequence is proposed. The method comprises, for a current pixel block: determining an application area comprising a set of pixels in blocks preceding the current block in the processing sequence; performing a gradient analysis on at least one pixel of the application area; selecting at least two intra prediction video coding modes among a plurality of intra prediction video coding modes usable for processing the current pixel block, wherein at least one of the selected intra prediction video coding modes is selected based on the gradient analysis; determining predictors of the current pixel block based on the at least two selected intra prediction video coding modes; and generating a predictor of the current pixel block based on the determined predictors.

The proposed method advantageously combine the selecting of at least one intra prediction video coding mode using a gradient analysis with the generating a final block predictor based on predictors determined based on several selected intra prediction video coding modes (some of which may be selected other than based on the gradient analysis), thereby providing a scheme which offers significant coding gain performances and signaling overhead reduction through the use of a flag (instead of a video coding mode index) to signal to the decoder that selection using a gradient analysis has been used for at least one intra prediction video coding mode.

In some embodiments, the proposed method further comprises: determining an application area comprising a plurality of pixels in blocks preceding the current block in the processing sequence; and performing a gradient analysis on at least two pixels of the application area.

In some embodiments, the proposed method further comprises: determining weights that are respectively associated with the selected intra prediction video coding modes, and combining the determined predictors using the determined weights. For example, the final block predictor may be generated using a weighted average of the predictors determined for the current pixel block.

In some embodiments, the at least two intra prediction video coding modes may be selected based on the gradient analysis.

In some embodiments, the proposed method further comprises: discarding at least one duplicate in the selected intra prediction video coding modes. This advantageously avoids the blending of identical predictors (determined based on duplicates in the selected intra prediction video coding modes).

In some embodiments, a plurality of intra prediction video coding modes are selected based on the gradient analysis, and the method may further comprise: replacing a discarded intra prediction video coding modes that was selected based on the gradient analysis, by selecting another intra prediction video coding mode based on the gradient analysis.

In some embodiments, a number of intra prediction video coding modes selected based on the gradient analysis may be based on a size of the current pixel block.

In some embodiments, the performing the gradient analysis may comprise: for at least one pixel of the application area, computing a gradient representing a directional change of an intensity at the pixel, and the selecting the at least one intra prediction video coding mode based on the gradient analysis may be based on at least one of the computed gradients.

The proposed method may in some embodiments be performed by a processor of an image encoder, and further comprise, at the image encoder: encoding, via the processor, the current pixel block according to the at least one intra prediction video coding mode selected based on the gradient analysis.

The proposed method may in some embodiments be performed by a processor of an image decoder, and further comprise, at the image decoder: decoding, via the processor, the current pixel block according to the at least one intra prediction video coding mode selected based on the gradient analysis.

In some embodiments, the at least one intra prediction video coding mode selected based on the gradient analysis may be used at the image encoder for encoding the current block, and may be used at the decoder for decoding the current block.

In some embodiments, the performing the gradient analysis may further comprise: computing a first gradient value representing an estimate magnitude of the directional change of the intensity at the at least one pixel, and a second gradient value representing an estimate orientation of the directional change of the intensity at the at least one pixel.

In some embodiments, the performing the gradient analysis may comprise: generating respective estimates of derivatives of an intensity level at the at least one pixel in the horizontal and vertical directions by performing a convolution of a source matrix of pixels of the image with horizontal and vertical filter matrices, respectively.

In some embodiments, the selecting the at least one intra prediction video coding mode based on the gradient analysis may comprise: for the at least one pixel of the application area, mapping the computed gradient to an intra prediction mode among the plurality of intra prediction video coding modes.

In some embodiments, the mapping may be performed by mapping the second gradient value to a directional intra prediction mode among the plurality of intra prediction video coding modes.

In some embodiments, the selecting the at least one intra prediction video coding mode based on the gradient analysis may further comprise: determining respective weight values for several intra prediction modes among the plurality of intra prediction video coding modes, based on gradients computed for pixels of the application area.

In some embodiments, the weight value for an intra prediction video coding mode may be determined based on the one or more computed gradient mapped to the intra prediction video coding mode.

In some embodiments, the weight value for an intra prediction video coding mode may be determined by combining respective first gradient values of computed gradients mapped to the intra prediction video coding mode.

In some embodiments, at least one of the at least one intra prediction video coding mode selected based on the gradient analysis may be selected based on its weight value. In particular, depending on the embodiment, some or all of intra prediction video coding modes selected based on the gradient analysis may be selected based on their respective weight value In some embodiments, the performing the gradient analysis may comprise: generating a histogram of gradient values respectively corresponding to intra prediction video coding modes of the plurality of intra prediction video coding modes, based on gradient values computed for pixels of the application area, and the selecting of at least one of the at least one intra prediction video coding mode selected based on the gradient analysis may be based on the histogram.

In some embodiments, the proposed method may further comprise: selecting an intra prediction video coding mode based on the gradient analysis based on a comparison of a corresponding gradient value in the histogram with a threshold.

In another aspect of the present subject disclosure, an apparatus is proposed, which comprises a processor, and a memory operatively coupled to the processor, wherein the apparatus is configured to perform a method as proposed in the present subject disclosure.

In yet another aspect of the present subject disclosure, a non-transitory computer-readable medium encoded with executable instructions which, when executed, causes an apparatus comprising a processor operatively coupled with a memory, to perform a method as proposed in the present subject disclosure, is proposed.

For example, in embodiments, the present subject disclosure provides a non-transitory computer-readable medium encoded with executable instructions which, when executed, causes an apparatus comprising a processor operatively coupled with a memory, to process an image divided into a plurality of pixel blocks which are processed according to a processing sequence, by performing, for a current block, the determining, via the processor, of an application area comprising a set of pixels in blocks preceding the current block in the processing sequence, the performing, via the processor, a gradient analysis on at least one pixel of the application area, the selecting, via the processor, at least two intra prediction video coding modes among a plurality of intra prediction video coding modes usable for processing the current pixel block, wherein at least one of the selected intra prediction video coding modes is selected based on the gradient analysis, the determining, via the processor, a plurality of predictors of the current pixel block based on the at least two selected intra prediction video coding modes, and the generating, via the processor, a predictor of the current pixel block based on the determined plurality of predictors.

In yet another aspect of the present subject disclosure, a computer program product comprising computer program code tangibly embodied in a computer readable medium, said computer program code comprising instructions to, when provided to a computer system and executed, cause said computer to perform a method as proposed in the present subject disclosure, is proposed. In another aspect of the present subject disclosure, a data set representing, for example through compression or encoding, a computer program as proposed herein, is proposed.

In yet another aspect of the present subject disclosure, a method of processing an image divided into a plurality of pixel blocks which are processed according to a processing sequence is proposed, which comprises, for a current pixel block: determine, via a processor of an image processing system, an application area consisting of a set of pixels in blocks preceding the current block in the processing sequence; for each pixel of the application area, computing, via the processor, a gradient representing a directional change of an intensity at the pixel; selecting, via the processor, at least two intra prediction video coding modes among a plurality of intra prediction video coding modes usable for processing the current pixel block, wherein at least one of the selected intra prediction video coding modes is selected based on at least one of the computed gradients, determining a plurality of predictors of the current pixel block based on the at least two selected intra prediction video coding modes; and generating a predictor of the current pixel block based on the determined plurality of predictors.

In yet another aspect of the present subject disclosure, a method of processing an image divided into a plurality of pixel blocks which are processed according to a processing sequence is proposed, which comprises, for a current pixel block: determining, via a processor of an image processing system, an application area comprising a set of pixels in blocks preceding the current block in the processing sequence; performing, via the processor, a gradient analysis on at least one pixel of the application area; selecting, via the processor, at least two intra prediction video coding modes among a plurality of intra prediction video coding modes usable for processing the current pixel block, wherein at least one of the selected intra prediction video coding modes is selected based on results of the gradient analysis, determining a plurality of predictors of the current pixel block based on the at least two selected intra prediction video coding modes; and generating a predictor of the current pixel block based on the determined plurality of predictors.

In yet another aspect of the present subject disclosure, a method of processing an image divided into a plurality of pixel blocks which are processed according to a processing sequence is proposed, which comprises, for a current pixel block: determining, via a processor of an image processing system, an application area comprising a set of pixels in blocks preceding the current block in the processing sequence; performing, via the processor, a gradient analysis on at least one pixel of the application area; selecting, via the processor, at least two spatial prediction video coding modes among a plurality of spatial prediction video coding modes usable for processing the current pixel block, wherein at least one of the selected spatial prediction video coding modes is selected based on results of the gradient analysis, determining a plurality of predictors of the current pixel block based on the at least two selected intra prediction video coding modes; and generating a predictor of the current pixel block based on the determined plurality of predictors.

In yet another aspect of the present subject disclosure, a method of processing an image divided into a plurality of pixel blocks which are processed according to a processing sequence is proposed, which comprises, for a current pixel block: determining, via a processor of an image processing system, an application area as a set of causal pixels; performing, via the processor, a gradient analysis on at least one pixel of the application area; selecting, via the processor, at least two spatial prediction video coding modes among a plurality of spatial prediction video coding modes usable for processing the current pixel block, wherein at least one of the selected spatial prediction video coding modes is selected based on results of the gradient analysis, determining a plurality of predictors of the current pixel block based on the at least two selected intra prediction video coding modes; and generating a predictor of the current pixel block based on the determined plurality of predictors.

In yet another aspect of the present subject disclosure, a method of processing an image divided into a plurality of pixel blocks which are processed according to a processing sequence is proposed, which comprises, for a current pixel block: determining an application area comprising a set of pixels in blocks preceding the current block in the processing sequence; performing a gradient analysis on at least one pixel of the application area; at least two intra prediction video coding modes among a plurality of intra prediction video coding modes usable for processing the current pixel block, wherein at least one of the selected intra prediction video coding modes is selected based on results of the gradient analysis, determining a plurality of predictors of the current pixel block based on the at least two selected intra prediction video coding modes; and generating a predictor of the current pixel block based on the determined plurality of predictors.

It should be appreciated that the present disclosure can be implemented and utilized in numerous ways, including without limitation as a process, an apparatus, a system, a device, and as a method for applications now known and later developed. These and other unique features of the system disclosed herein will become more readily apparent from the following description and the accompanying drawings.

BRIEF DESCRIPTION OF THE DRAWINGS

The present subject disclosure will be better understood and its numerous objects and advantages will become more apparent to those skilled in the art by reference to the following drawings, in conjunction with the accompanying specification, in which:

FIGS. 2a-2e illustrate exemplary intra prediction modes, to which the proposed method may be applied in accordance with one or more embodiments;

DETAILED DESCRIPTION

Figure 1:
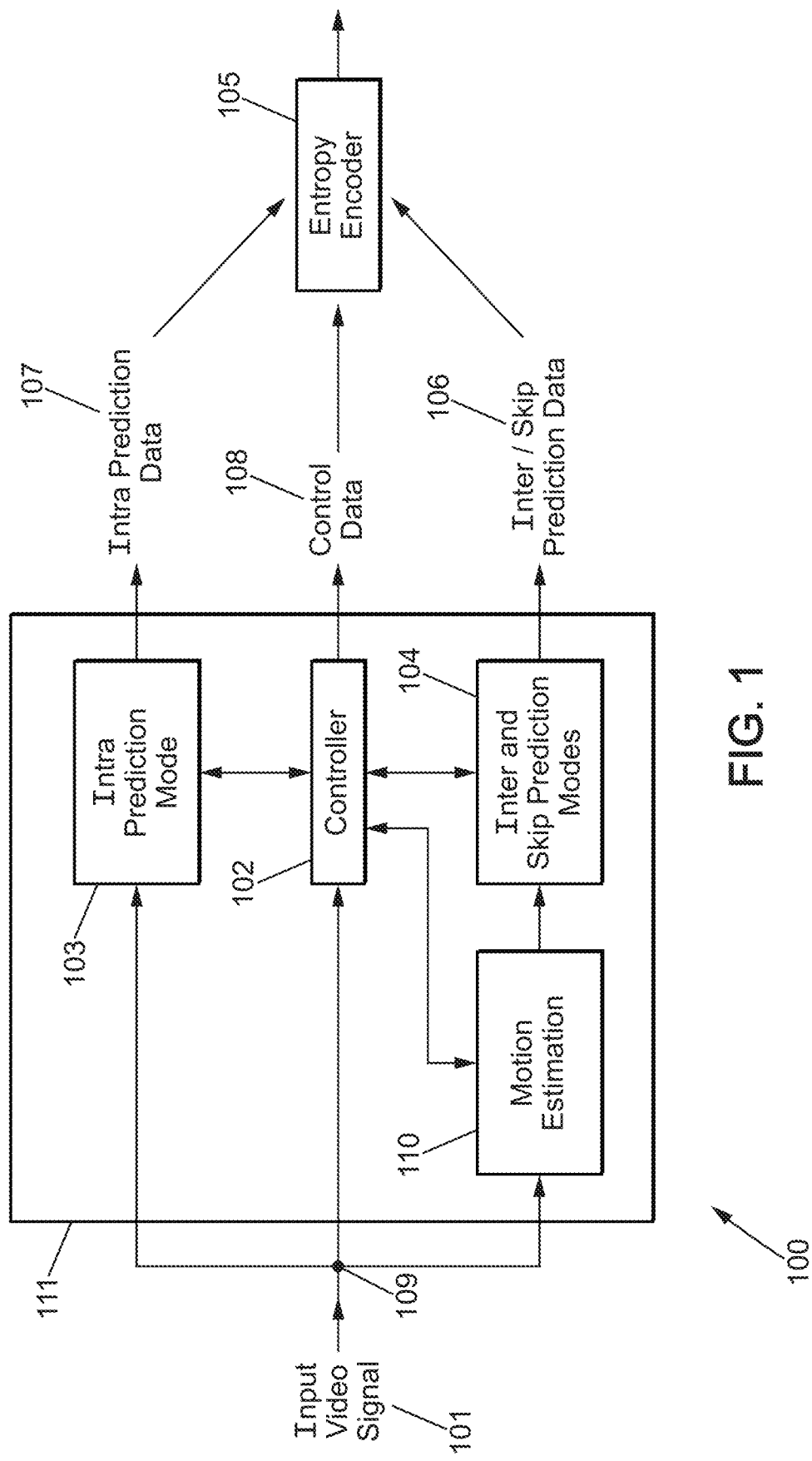
FIG. 1 is a block diagram illustrating an exemplary video encoder on which the proposed method may be implemented in accordance with one or more embodiments.

For simplicity and clarity of illustration, the drawing figures illustrate the general manner of construction, and descriptions and details of well-known features and techniques may be omitted to avoid unnecessarily obscuring the discussion of the described embodiments of the disclosure. Additionally, elements in the drawing figures are not necessarily drawn to scale. For example, the dimensions of some of the elements in the figures may be exaggerated relative to other elements to help improve understanding of embodiments of the present disclosure. Certain figures may be shown in an idealized fashion in order to aid understanding, such as when structures are shown having straight lines, sharp angles, and/or parallel planes or the like that under real-world conditions would likely be significantly less symmetric and orderly. The same reference numerals in different figures denote the same elements, while similar reference numerals may, but do not necessarily, denote similar elements.

In addition, it should be apparent that the teaching herein can be embodied in a wide variety of forms and that any specific structure and/or function disclosed herein is merely representative. In particular, one skilled in the art will appreciate that an aspect disclosed herein can be implemented independently of any other aspects and that several aspects can be combined in various ways.

The present disclosure is described below with reference to functions, engines, block diagrams and flowchart illustrations of the methods, systems, and computer program according to one or more exemplary embodiments. Each described function, engine, block of the block diagrams and flowchart illustrations can be implemented in hardware, software, firmware, middleware, microcode, or any suitable combination thereof. If implemented in software, the functions, engines, blocks of the block diagrams and/or flowchart illustrations can be implemented by computer program instructions or software code, which may be stored or transmitted over a computer-readable medium, or loaded onto a general purpose computer, special purpose computer or other programmable data processing apparatus to produce a machine, such that the computer program instructions or software code which execute on the computer or other programmable data processing apparatus, create the means for implementing the functions described herein.

Embodiments of computer-readable media includes, but are not limited to, both computer storage media and communication media including any medium that facilitates transfer of a computer program from one place to another. As used herein, a "computer storage media" may be any physical media that can be accessed by a computer or a processor. In addition, the terms «memory» and «computer storage media" include any type of data storage device, such as, without limitation, a hard drive, a flash drive or other flash memory devices (e.g. memory keys, memory sticks, key drive), CD-ROM or other optical storage, DVD, magnetic disk storage or other magnetic storage devices, memory chip(s), Random Access Memory (RAM), Read-Only-Memory (ROM), Electrically-erasable programmable read-only memory (EEPROM), smart cards, or any other suitable medium that can be used to carry or store program code in the form of instructions or data structures which can be read by a computer processor, or a combination thereof. Also, various forms of computer-readable media may transmit or carry instructions to a computer, including a router, gateway, server, or other transmission device, wired (coaxial cable, fiber, twisted pair, DSL cable) or wireless (infrared, radio, cellular, microwave). The instructions may comprise code from any computer-programming language, including, but not limited to, assembly, C, C++, Python, Visual Basic, SQL, PHP, and JAVA.

Unless specifically stated otherwise, it will be appreciated that throughout the following description discussions utilizing terms such as processing, computing, calculating, determining, or the like, refer to the action or processes of a computer or computing system, or similar electronic computing device, that manipulate or transform data represented as physical, such as electronic, quantities within the registers or memories of the computing system into other data similarly represented as physical quantities within the memories, registers or other such information storage, transmission or display devices of the computing system.

The terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

Additionally, the word "exemplary" is used herein to mean "serving as an example, instance, or illustration". Any embodiment or design described herein as "exemplary" is not necessarily to be construed as preferred or advantageous over other embodiments or designs.

In the following description and claims, the terms "coupled" and "connected", along with their derivatives, may be indifferently used to indicate that two or more elements are in direct physical or electrical contact with each other, or two or more elements are not in direct contact with each other, but yet still co-operate or interact with each other.

The proposed process may be implemented by any video encoder, video decoder, or video codec configured for encoding and/or decoding images (or frames) of input video data using predictive coding exploiting spatial redundancies of pixel blocks in images of the input video data (e.g. intra prediction video coding), such as, for example a video encoder and/or decoder compliant with the any of the H.261, MPEG-1 Part 2, H.262, MPEG-2 Part 2, H.264/AVC, H.265/HEVC, MPEG-4 Part 2 and SHVC (Scalable HEVC) standards.

Shown on FIG. 1 is a video encoder 100 that receives at input 109 an input video stream 101 that includes a plurality of images (or frames) to be processed for the encoding of the input video stream. The video encoder includes a controller 102, operatively coupled with the input interface 109, configured for controlling the operations of a motion estimation unit 110 and an inter prediction encoding unit 104, as well as an intra prediction encoding unit 103. Data received on the input interface 109 are transmitted to the motion estimation unit 110, to the inter prediction encoding unit 104, to the intra prediction encoding unit 103, and to the controller 102. Together with the controller 102, the motion estimation unit 110, the inter prediction encoding unit 104, and the intra prediction encoding unit 103 form an encoding unit 111 which is operatively coupled to the input interface 109.

The intra prediction encoding unit 103 generates intra prediction data 107 which are inputted to an entropy encoder 105. The motion estimation unit 110 generates motion estimation data 106 which are provided to the controller 102 as well as to the inter prediction encoding unit 104 for inter prediction encoding. The inter prediction encoding unit 104 generates inter prediction data which are inputted to the entropy encoder 105. For example, in some embodiments, data provided to the decoder for an inter prediction encoding may include pixel residuals and information related to one or more motion vectors. Such information related to one or more motion vectors may include one or more indices that each identifies a prediction vector in a list of prediction vectors known to the decoder. Data provided to the decoder for a skip prediction mode may typically not include any pixel residual, and may also include one or more indices that each identifies a prediction vector in a list of prediction vectors known to the decoder. The list of prediction vector used for inter prediction encoding may not be identical to the list of prediction vectors used for skip prediction encoding.

The controller 102 generates control data which may also be provided as input data to the entropy encoder 105.

In one or more embodiments, an image undergoing processing is typically divided into blocks or coding units, the form and size of which may be determined based on the size of the pixel matrix that corresponds to the image, for example into square-shaped macroblocks of size 16×16 pixels. These blocks can form a set of blocks, corresponding to a partition of the image, for which a processing sequence may be defined that represents the order in which the blocks of the set are to be processed (e.g., encoded or compressed). In the exemplary case of square-shaped blocks of equal sizes, the processing sequence may define a processing order according to which the block located at the leftmost upper corner of the pixel matrix is processed first, followed by the block located immediately to the right of the previous block, until the block at the end of the upper line of blocks (that is, the block located at the rightmost upper corner of the pixel matrix) is processed, followed by the block located at the leftmost on the line immediately below the upper line of blocks, followed by the blocks of this second line processed from left to right, and so on until the block located at the rightmost lower corner of the pixel matrix, which is processed last.

One may therefore consider a so-called "current block," that is, a block being under processing in the current image. In some embodiments, the processing of the current block may include subdividing the current block into sub-blocks, so that the block may be processed with a finer spatial granularity. The processing of a block may also include a predicting of the pixels of the block, using spatial correlations (within the same image) or temporal correlations (in previously processed images) among pixels. In embodiments where a plurality of prediction type may be used, such as an intra prediction, an inter prediction, and/or a skip prediction, implemented in the encoder, the prediction of the block pixels typically includes a selection of a prediction type, and the generation of prediction data that correspond to the selected prediction type, which may form, together with prediction type selection data, a set of encoding parameters.

A video encoder using prediction coding, whether it is spatial prediction codning (e.g. intra prediction) or temporal prediction coding (e.g. inter or skip prediction), will typically include a decoder unit, or pixel reconstruction unit (not represented on FIG. 1), configured for generating reconstructed pixels, from the reconstructing of pixels that have been encoded, which reconstructed pixels are used for the prediction of pixels of a current block (i.e. pixels of a block being encoded).

In some embodiments, the prediction of the block under processing may comprise a calculation of pixel residuals, which respectively correspond to a gap, or distance, or difference, between pixels of the current block and corresponding pixels of a prediction block. The pixel residuals may be transmitted to the decoder in some embodiments after transform and quantization.

Different encoding modes may therefore be available for the encoding of a current block, so that encoding information 106-108 may be included in the data generated by the encoder further to the encoding of the current block. Such encoding information may for example comprise information on a coding mode (e.g. information indicating the type of prediction, among intra, inter, and skip, or among intra and inter) used for encoding the current block, information on the partitioning of the current block into sub-blocks, as the case may be, motion estimation information in the case of a prediction of the inter or skip type, and/or intra prediction mode information 107 in the case of a prediction of the intra type.

Examples of intra prediction modes are described hereinafter in order to assist the understanding of the proposed method according to the present subject disclosure.

As discussed above intra prediction encoding of a current image typically involves predicting pixels of a block (or set) of pixels undergoing processing using previously encoded pixels in the current image. Different intra prediction modes may be used, of which some are described in the following:

In the so-called "Discrete Continuous" (DC) intra prediction mode, values of neighboring pixels of the current block that belong to previously encoded blocks are used to calculate a mean value of these neighboring pixel values. The prediction block is then built using for each pixel the calculated mean value.

Figures 2A, 2B:
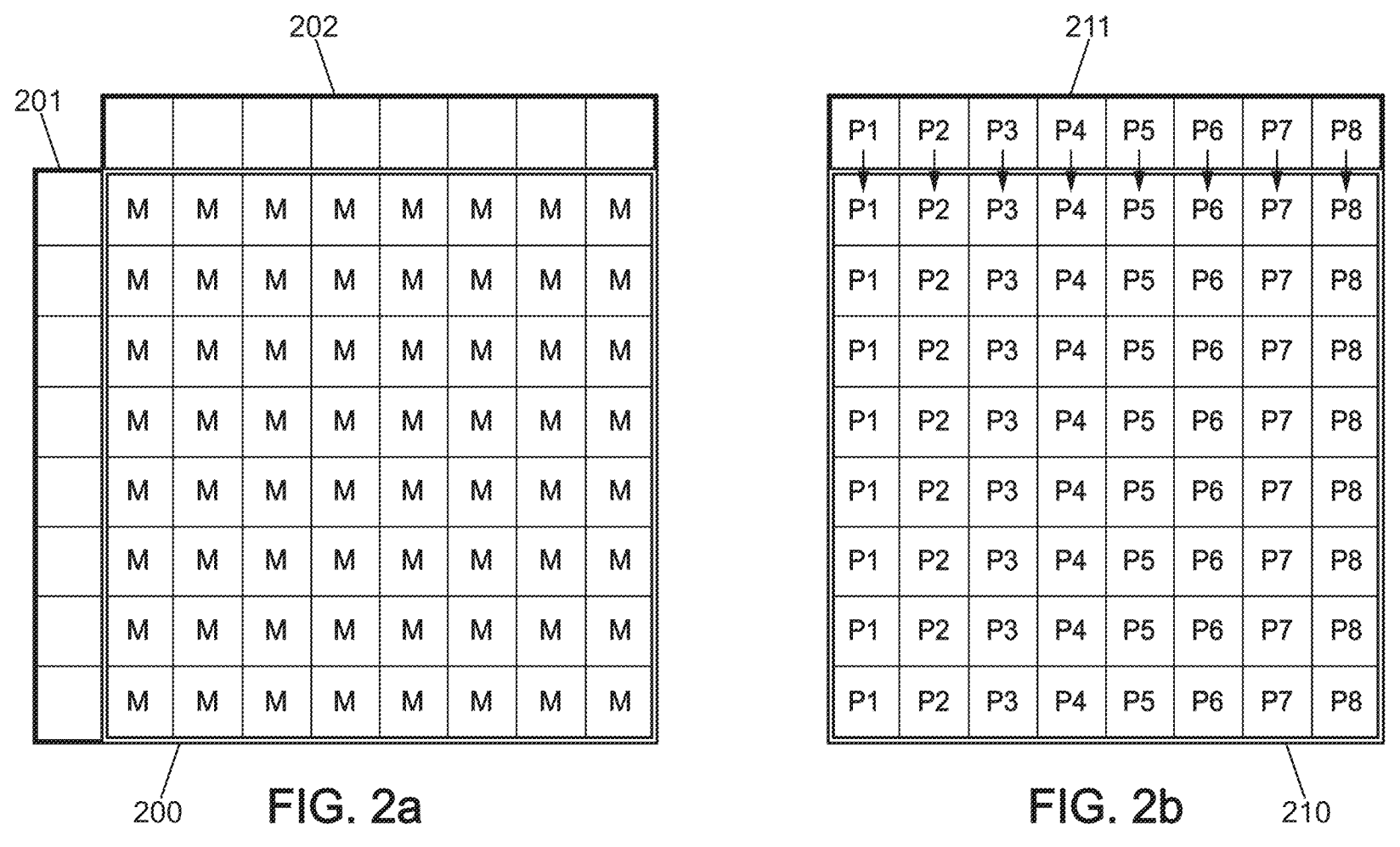

For example, for a prediction block 200 of 8×8 pixels as that illustrated on FIG. 2a, two sets of 8 neighboring pixels 201, 202 that respectively belong to the neighboring block located on the left of the current block and to the neighboring block located above the current block, may be used to calculate a mean value M of the values of these 16 pixels. The calculated mean value is used to fill the pixels of the prediction block 200, that is, the calculated mean value M is assigned as value of each of the pixels of the prediction block 200.

In the so-called "Vertical" (V) intra prediction mode, values of previously encoded neighboring pixels located above the current block are used, and each pixel of the prediction block is assigned the value of the neighboring pixel located in the same column.

For example, for a block 210 of 8×8 pixels as that illustrated on FIG. 2b, the set of 8 neighboring pixels 211 that belong to the neighboring block located immediately above the current block, may be used to fill the pixels of the prediction block 210, assuming that the 8 neighboring pixels 211 have been previously encoded. As shown on FIG. 2b, each pixel of the prediction block 210 takes the value of the one of the 8 neighboring pixels 211 located in the same column as the pixel, and the 8 neighboring pixels 211 are distributed in the prediction block 200 according to a vertical prediction direction.

In the so-called "Horizontal" (H) intra prediction mode, values of previously encoded neighboring pixels located on the left of the current block are used, and each pixel of the prediction block is assigned the value of the neighboring pixel located on the same line as the pixel.

Figures 2C, 2D:
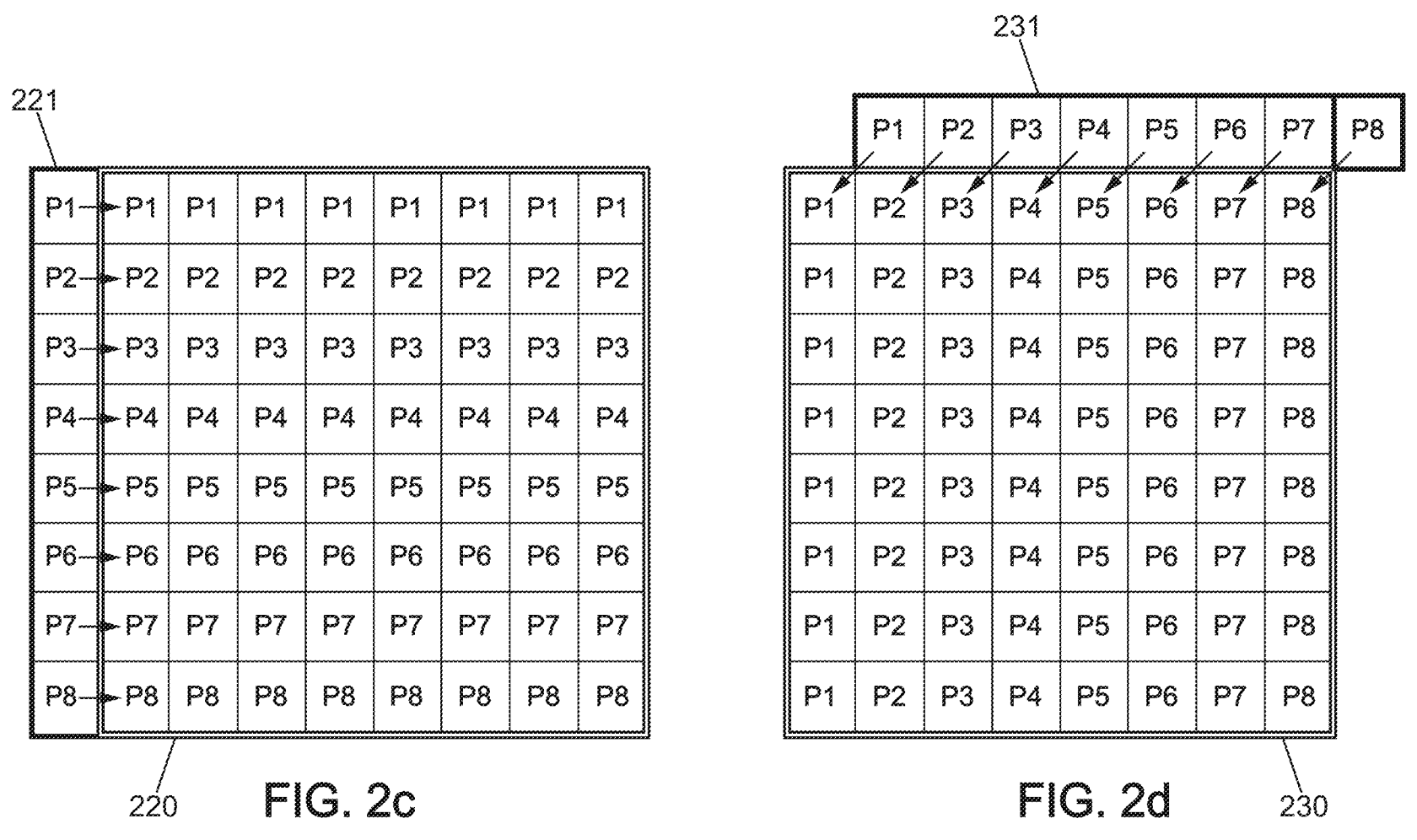

For example, for a block 220 of 8×8 pixels as that illustrated on FIG. 2c, the set of 8 neighboring pixels 221 that belong to the neighboring block located on the left of the current block, may be used to fill the pixels of the prediction block 220, assuming that the 8 neighboring pixels 221 have been previously encoded. As shown on FIG. 2c, each pixel of the prediction block 220 takes the value of the one of the 8 neighboring pixels 221 located on the same line as the pixel, and the 8 neighboring pixels 221 are distributed in the prediction block 220 according to a horizontal prediction direction.

In the so-called "Vertical-Left" (VL) intra prediction mode, values of previously encoded neighboring pixels located above the current block with a one-pixel shift to the right as compared to a line of pixels of the current block are used, and each pixel of the prediction block is assigned the value of the neighboring pixel located above with a one-pixel shift to the right from the pixel of the block located on the upper line of the block and on the same column as the pixel.

For example, for a block 230 of 8×8 pixels as that illustrated on FIG. 2d, the set of 8 neighboring pixels 231 located above the current block 230 with a one-pixel shift to the right as compared to a line of pixels of the current block 230, may be used to fill the pixels of the prediction block 230, assuming that the 8 neighboring pixels 231 have been previously encoded. As shown on FIG. 2d, each pixel 232a of the prediction block 230 takes the value of the one 232b of the 8 neighboring pixels 231 located above with a one-pixel shift to the right from the pixel 232c of the block located on the upper line of the block and on the same column as the pixel 232a, and the 8 neighboring pixels 231 are distributed in the prediction block 230 according to a vertical left prediction direction.

In the so-called "Vertical-Right" (VR) intra prediction mode, values of previously encoded neighboring pixels located above the current block with a one-pixel shift to the left as compared to a line of pixels of the current block are used, and each pixel of the prediction block is assigned the value of the neighboring pixel located above with a one-pixel shift to the left from the pixel of the block located on the upper line of the block and on the same column as the pixel.

Figure 2E:
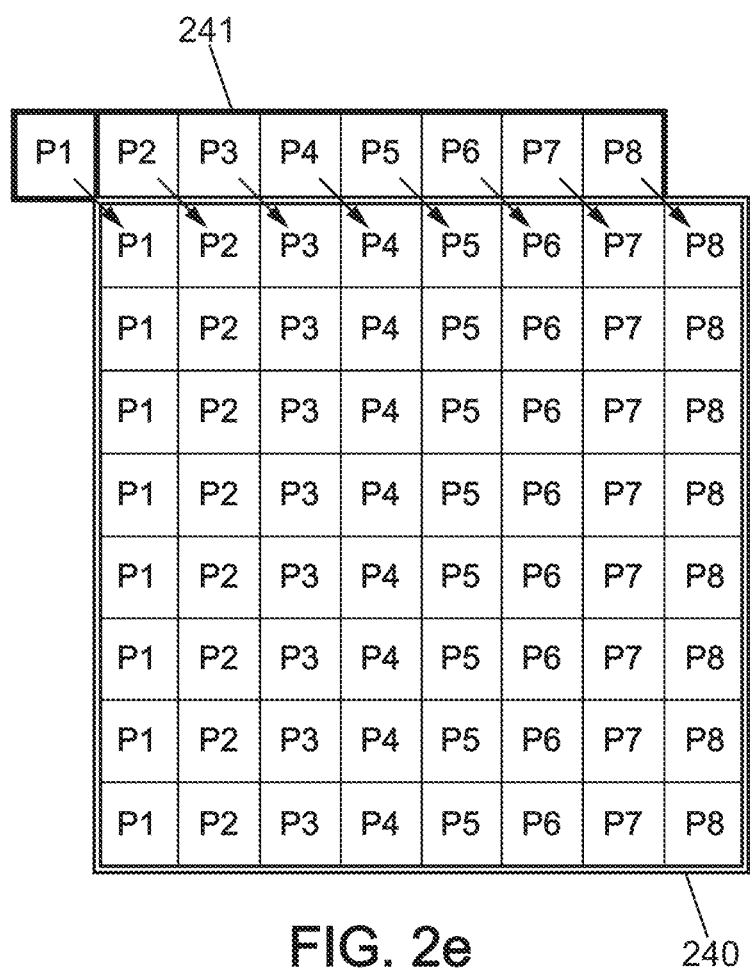

For example, for a block 240 of 8×8 pixels as that illustrated on FIG. 2e, the set of 8 neighboring pixels 241 located above the current block 240 with a one-pixel shift to the left as compared to a line of pixels of the current block 240, may be used to fill the pixels of the prediction block 240, assuming that the 8 neighboring pixels 241 have been previously encoded. As shown on FIG. 2e, each pixel 242a of the prediction block 240 takes the value of the one 242b of the 8 neighboring pixels 241 located above with a one-pixel shift to the left from the pixel 242c of the block located on the upper line of the block and on the same column as the pixel 242a, and the 8 neighboring pixels 241 are distributed in the prediction block 240 according to a vertical right prediction direction.

Nine intra prediction modes have been specified for the H.264/MPEG-4 AVC video coding standard (including the above-described DC, H, V, VL, VR, HL, and HR intra prediction modes), including a DC prediction mode and 8 directional modes. The HEVC video coding standard supports 35 intra prediction modes, including a planar prediction mode, a DC prediction mode, and 33 directional modes.

Information on the selected intra prediction mode may also be predicted so as to reduce its coding cost. Indeed, the cost of transmission in the encoded data stream of an index identifying the selected intra prediction mode would otherwise increase with the number of supported intra prediction modes. Even in the case of the H.264/MPEG-4 AVC video coding standard, transmitting an index $i \in \{1; 2; 3; 4; 5; 6; 7; 8; 9\}$ that identifies for each block encoded with intra prediction the selected mode among the 9 intra prediction modes supported by the standard is generally considered too costly in terms of coding cost.

To this end, a "most probable mode" (MPM) may be determined, and encoded using the lowest possible number of bits to be transmitted to the decoder. The MPM is generated by predicting the intra prediction mode used to encode the current block. As a consequence, in cases where the current block is encoded with intra prediction, only pixel residual information and MPM information may be included in the bitstream generated by the encoder to be transmitted to the decoder after quantization and entropy coding.

However, even though the MPM may be used to lower the coding cost of information related to the selected intra prediction mode, an estimated 4% to 15% of the total bitstream generated at the output of an HEVC encoder corresponds to prediction mode information necessary for the decoding of the encoded video data. It is therefore desirable to decrease such proportion of control information in the bitstream generated at the output of the encoder, in particular for applications which require the transmission, including wireless transmission, of such control information as included in the encoded bitstream, to the decoder.

Figure 3A:
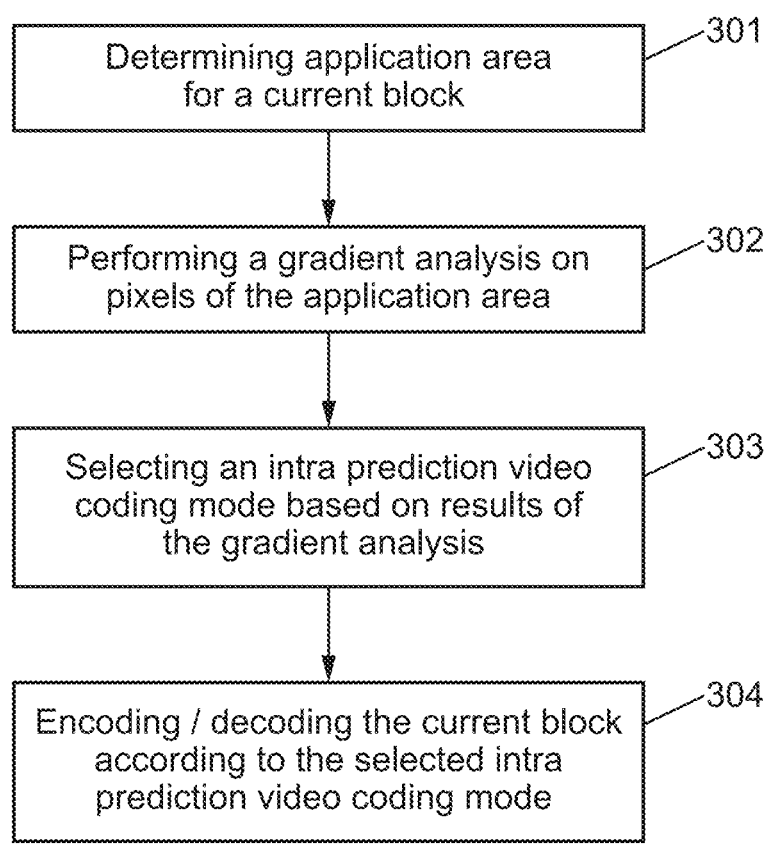
FIG. 3a is a block diagram illustrating an exemplary DIMD video processing method that may be used in one or more embodiments.

FIG. 3a is a block schematic diagram of a so-called "DIMD" (Derived Intra Mode at Decoder) method of processing an image that may be used as part of the proposed method according to embodiments of the present subject disclosure.

As discussed above, the image in some embodiments may be divided into a plurality of pixel blocks, which may or may not be of equal size or of same shape, for purposes of encoding the image through encoding of the blocks according to a processing sequence.

In one or more embodiments, for a current pixel block being encoded, a so-called "application area," comprising a set of pixels in blocks preceding the current block in the processing sequence, may be determined (301). In some embodiments, the application area may be a set of pixels in blocks preceding the current block in the processing sequence.

Then a gradient analysis may be performed (302) on at least one pixel of the application area. Depending on the embodiment, the gradient analysis may be performed on one or several pixels of the application area, or each pixel of the application area.

The gradient analysis may comprise the computing of a gradient for one or several, or depending on the embodiment, each pixel of the application area. In some embodiments, the computed gradient may represent a directional intensity change at the pixel. In some embodiments, the gradient may be computed as part of an edge detection processing performed, at the encoder side and/or, at the decoder side, on decoded or reconstructed pixels, according to one or several edge detection algorithms.

According to the DIMD scheme, an intra prediction video coding mode may be selected (303), among a plurality of intra prediction video coding modes for processing the current block, based on the gradient analysis. For example, the intra prediction video coding mode may be selected based on at least one of computed gradients. Because each of the computed gradients provides information on an edge orientation at the corresponding pixel, the plurality of intra prediction video coding modes may in some embodiments be chosen to correspond to the directional intra prediction video coding modes supported by the encoder for encoding the current block, and by the decoder for decoding the encoded pixels of the block. For example, in the case of an H.264/MPEG-4 AVC video codec, an intra prediction video coding mode may be selected among the 9 intra prediction modes supported by the AVC codec, based on at least one of the computed gradients. In the exemplary case of a HEVC video codec, an intra prediction video coding mode may be selected among the 35 intra prediction modes supported by the HEVC codec, based on at least one of the computed gradients.

The current block may then be processed (304) that is, for example, encoded at the encoder side, or decoded at the decoder side, according to the selected intra prediction video coding mode.

The DIMD scheme may advantageously alleviate the need to transmit to the decoder information related to the intra prediction video coding mode used for encoding the current block, as the determination of an application area, the gradient analysis performed on the application area (in embodiments the computing of a gradient for each pixel of the application area), and the selection of an intra prediction video coding mode based on the gradient analysis (in embodiments based on at least one of the computed gradients) may be performed at the decoder in an autonomous manner, that is, without the need for any data related to the intra prediction video coding mode selection performed at the encoder.

Therefore, an encoder configured for performing the DIMD scheme may be configured for selecting an intra prediction video coding mode among a plurality of available intra prediction video coding modes, for encoding a current block, based on a gradient analysis performed at the encoder on its determined application area, and a decoder configured for performing the proposed method may be capable of selecting the same intra prediction video coding mode among the plurality of available intra prediction video coding modes, for decoding the current block, based on its own gradient analysis performed at the decoder on its determined application area, thereby alleviating the need for said decoder to receive information specifying the intra prediction video coding mode used at the encoder for encoding the current block.

In order to ensure that the encoder and decoder select the same intra prediction mode, the encoder and the decoder may be configured in some embodiments to determine the same application area, in correspondence with the same current block, that is, at the encoder, a set of pixels to be encoded, and at the decoder, the same set of pixels in the pixel matrix corresponding to the image, to be decoded.

The DIMD scheme therefore advantageously provides a method for autonomously selecting, at the encoder and at the decoder, an intra prediction video coding mode, thereby eliminating the need to include, in the bitstream generated by the encoder, information related to the intra prediction video coding mode used for coding a current block of an image. This results in an improvement in the compression efficiency for a given bitrate, or in a decrease of the bitrate at the output of the encoder.

Referring again to FIG. 3a, a decoder configured for performing a method according to the present subject disclosure may be configured, for a processing comprising a decoding of an image divided into a plurality of pixel blocks, the decoder being configured for decoding the image by sequentially decoding the pixel blocks according to a processing sequence to determine for a current pixel block an application area consisting of a set of pixels in blocks preceding the current block in the processing sequence, perform a gradient analysis on at least one pixel of the application area, and to select, based on results of the gradient analysis, an intra prediction video coding mode among a plurality of intra prediction video coding modes usable for encoding the current block. In some embodiments, the decoder may be configured to compute for one or more pixels, or depending on the embodiment, each pixel of the application area, a gradient representing an edge intensity level and an edge orientation at the pixel, and to select, based on at least one of the computed gradients, an intra prediction video coding mode among a plurality of intra prediction video coding modes usable for encoding the current block.

Depending on the embodiment, the processing sequence at the encoder (encoding sequence) may or may not be identical to the processing sequence at the decoder (decoding sequence), provided that the processing sequence is designed so that the encoder and the decoder may process pixel(s) of the same application area for each processed current block.

A video decoder may then be configured for, using the DIMD processing scheme, autonomously selecting an intra prediction video coding mode, which may then be used for decoding the current block.

The DIMD scheme may therefore be performed autonomously at the encoder and at the decoder, and merely requires that control information indicating that the proposed method has been used by the encoder for a current block be provided to the decoder. The decoder may be configured for, upon receipt of such control information, performing the proposed method for selecting an intra prediction video coding mode to be used for decoding of the current block.

For these reasons, the DIMD scheme may also be viewed and implemented as a new encoding mode, which may be referred to as Derived Intra Mode at Decoder, or as the acronym "DIMD," along other conventional encoding modes, such as, for example, the intra encoding mode, the inter encoding mode, the skip encoding mode, etc.

Figure 3B:
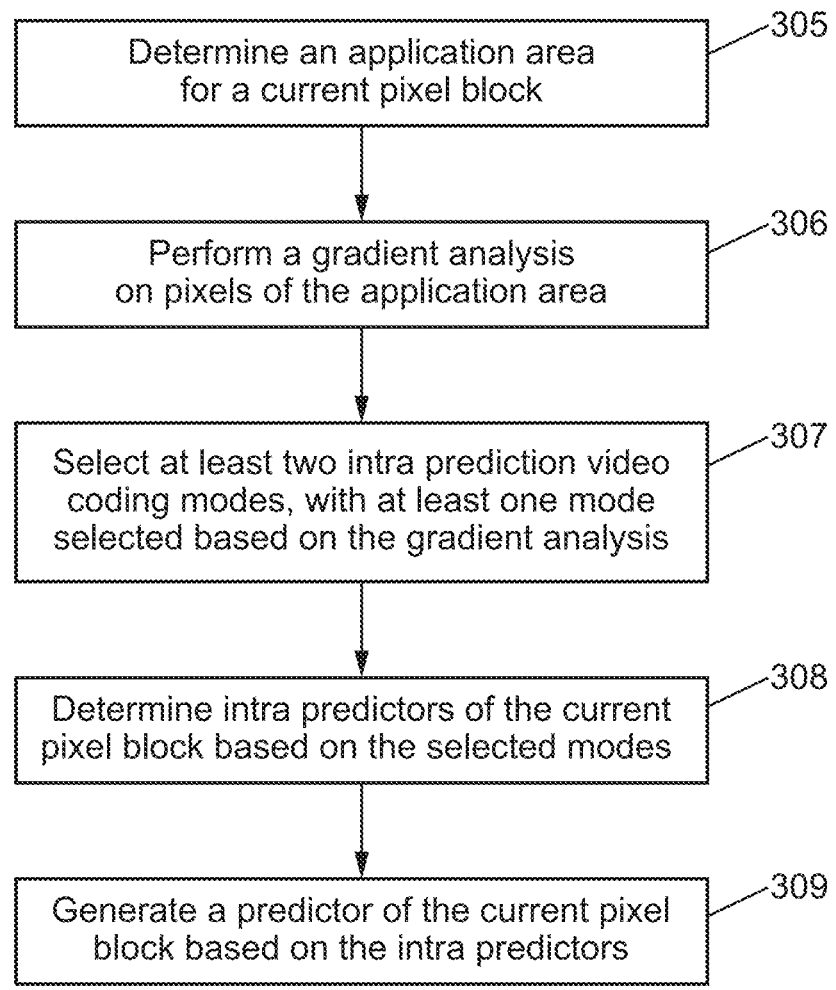
FIG. 3b is a block diagram illustrating an exemplary video processing method in accordance with one or more embodiments.

FIG. 3b is a block schematic diagram of a method of processing an image according to embodiments of the present subject disclosure.

As described above with respect to the DIMD scheme, an image to be processed according to embodiments of the proposed method may be divided into a plurality of pixel blocks, which pixel blocks are processed according to a processing sequence for purposes of encoding the image through encoding of the blocks according to the processing sequence.

The pixel blocks may or may not be of equal size or of same shape. The pixel blocks of the image may each be any set of pixels of the image, and may be chosen so that the set of blocks forms a partition of the image, that is, each pixel of the image belongs to only one block.

In the H.264/MPEG-4 AVC standard, a picture may be divided into so-called "macroblocks" of 16×16 pixels. Each macroblock can be split into multiple blocks depending on the coding mode selected at the macroblock level. In intra, a macroblock can be split into four 8×8 blocks, or sixteen 4×4 blocks.

In HEVC, a picture may be divided into so-called Coding Tree Units (CTU). The size of the CTU is fixed for an entire sequence, and is signaled in the Sequence Parameter Set (SPS). It can vary between 8×8 and 64×64. Each CTU can later be split into 4 Coding Units (CU), and each CU can be further split into 4 smaller CUs, and so on, until a maximum CU depth is reached (CU size varies between 8×8 and 64×64).

The pixel values of each block may correspond, depending on the block, to luma sample values, or to chroma sample values. For example, the H.264/MPEG-4 AVC video coding standard uses so-called "macroblocks", each macroblock comprising a 16×16 block of luma samples, and two corresponding 8×8 blocks of chroma samples for 4:2:0 color sampling.

The processing sequence for processing, at the image processor (for example at the encoder or at the decoder), the blocks of the image may define a sequence according to which blocks are encoded one after another. Because the blocks of the image may be encoded at an encoder according to a predetermined sequence, the encoded blocks may be decoded at the decoder according to the same processing sequence. For example, a raster scan sequence may scan the blocks of the image starting from the block located at the leftmost upper corner of the image (represented by a pixel matrix), and progress to the block adjacent to the previously scanned block located to the right. At the end of a line of block, the sequence proceeds to the next line scanning the blocks from the left to the right. Blocks sub-divided into sub-blocks may be scanned in the same manner.

In one or more embodiments, for a current pixel block being encoded, a so-called "application area" or "template" comprising a set of pixels in blocks preceding the current block in the processing sequence, is determined (305). In some embodiments, the application area may be a set of pixels in blocks preceding the current block in the processing sequence. In some embodiments where the encoding of blocks involves the decoding, at the encoder, of previously encoded blocks, the application area may be chosen to comprise a plurality of pixels belonging to blocks that have already been encoded (and therefore decoded).

In some embodiments, the application area may be limited to one pixel. In other embodiments, the application are may comprise several pixels.

Figure 6A:
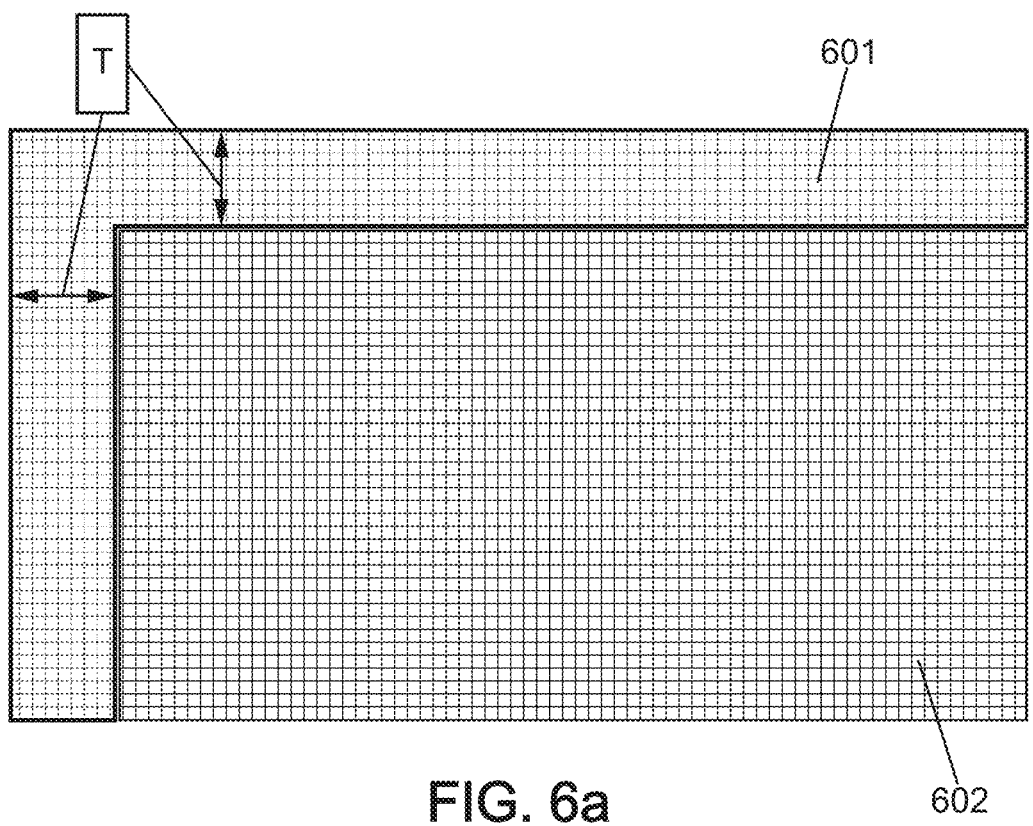
FIGS. 6a and 6b respectively illustrate an application area and the calculation of a gradient for a pixel of the application area.
Figure 6B:
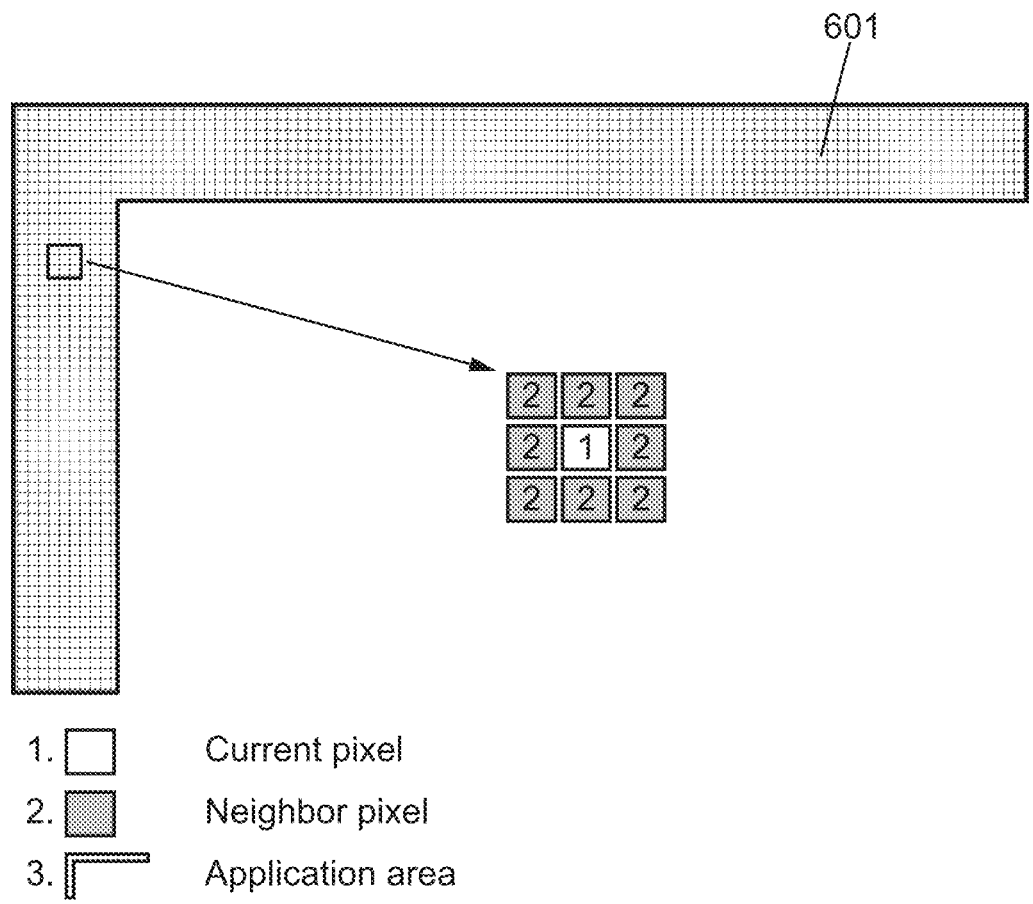

The pixel(s) of the application area may be chosen to be pixels located immediately around the current pixel blocks, as discussed below and illustrated in FIGS. 6a and 6b. In some embodiments, the number of pixels of the application area may be dynamically chosen based on the size (number of pixels) of the current pixel block to be processed.

A gradient analysis may be performed (306) on at least one pixel of the application area. Depending on the embodiment, the gradient analysis may be performed on one or several pixels of the application area (in the cases where the application area comprises a plurality of pixels), or on all of the pixels of the application area.

In one or more embodiments, the gradient analysis may comprise the computing of a gradient for one or several, or depending on the embodiment, each pixel of the application area. In some embodiments, the computed gradient(s) may represent a directional intensity change at the pixel. In some embodiments, the gradient may be computed as part of an edge detection processing performed, at the encoder side and/or, at the decoder side, on decoded or reconstructed pixels, according to one or several edge detection algorithms.

For example, a gradient may be computed for each pixel of the application area. In the exemplary case of a current pixel block of size 16 (4×4 pixels), the application area may be chosen to comprise 9 pixels located on the left and upper edges of the current pixel block that have already been decoded (as part of the encoding process). Nine gradient values may then be computed, one for each of the 9 pixels of the application area. In the cases where the application area comprises more than 9 pixels for a size 16 current block, such as illustrated on FIG. 7a (current pixel block (702) of size 16 pixels, and application area (701) of 33 pixels), nine gradient values may still be computed, based on the pixels of the application area.

In one or more embodiments, a plurality of intra prediction video coding modes may be selected (307), among intra prediction video coding modes for encoding the current block. Among the selected intra prediction video coding modes, at least one mode may be selected based on the gradient analysis.

In some embodiments, the at least one intra prediction video coding mode selected based on the gradient analysis may be selected based on at least one of computed gradients. Because each of the computed gradients provides information on an edge orientation at the corresponding pixel, some or all of the at least one intra prediction video coding mode(s) may in some embodiments be chosen to correspond to the directional intra prediction video coding modes supported by the encoder for encoding the current block, and by the decoder for decoding the encoded pixels of the block.

For example, in the case of an H.264/MPEG-4 AVC video codec, at least one intra prediction video coding mode may be selected among the 9 intra prediction modes supported by the AVC codec, based on at least one of the computed gradient(s). In the exemplary case of a HEVC video codec, at least one intra prediction video coding mode may be selected among the 35 intra prediction modes supported by the HEVC codec, based on at least one of the computed gradient(s).

Depending on the embodiments, the at least two selected intra prediction video coding modes may be selected using the DIMD scheme, that is, based on the gradient analysis, or one of the two selected intra prediction video coding modes may be selected using another scheme, such as a rate distorsion optimization scheme, while at least one of the selected intra prediction video coding modes may be selected using the DIMD scheme.

That is, at least two intra prediction video coding modes may be selected among a plurality of intra prediction video coding modes usable for processing (for example, encoding and/or decoding) the current pixel block, with at least one mode being selected using the DIMD scheme, that is, based on the gradient analysis, and one or more modes being selected using the DIMD scheme or other intra prediction video coding mode selection schemes.

In some embodiments, several intra prediction video coding modes may be selected using the DIMD scheme. In such cases, the application area may be chosen to comprise a plurality of pixels, and the gradient analysis performed on the application area may be performed by computing a plurality of gradient values respectively corresponding to pixels, or groups of pixels, of the application area.

In other embodiments, only one intra prediction video coding mode may be selected using the DIMD scheme. In such case, the application area may be chosen to comprise one or more pixels, and the gradient analysis performed on the application area may be performed by computing a gradient value for at least one pixel of the application area.

In some embodiments, all the modes may be selected according to the DIMD scheme, that is, based on the gradient analysis, whereas in other embodiments, the selected modes may be a mix of selections according to the DIMD scheme and other schemes which do not use the gradient analysis.

In one or more embodiments, predictors of the current pixel block may then be determined (308) based on the selected intra prediction video coding modes. In some embodiments, the predictors may be computed using the selected intra prediction video coding modes. In some embodiments, a plurality of respective predictors may be determined in correspondence with the at least two selected intra prediction video coding modes, for example as described above in connection with FIGS. 2a-2e. For each of the selected intra prediction video coding modes, a corresponding predictor of the current pixel block may be determined according to the mode.

In one or more embodiments, a (so called "final block") predictor of the current pixel block may be generated (309) based on the determined predictors.

In some embodiments, the final block predictor of the current pixel block may be determined by combining the predictors, possibly using weigths respectively associated with the predictors.

The proposed method may therefore be viewed as an extension of the DIMD scheme, an embodiment of which is illustrated by FIG. 3a, as at least one of the intra prediction video coding mode may be selected based on a gradient analysis according to the present subject disclosure.

The current pixel block may then be processed that is, for example, encoded at the encoder side, or decoded at the decoder side, according to the generated final block predictor.

The proposed scheme may advantageously alleviate the need to transmit to the decoder information related to the at least one intra prediction video coding mode selected based on the gradient analysis, and used for encoding the current block, as the determination of an application area, the gradient analysis performed on the application area (in embodiments the computing of a gradient for at least one, or each pixel of the application area), and the selection of the at least one intra prediction video coding mode based on the gradient analysis, may be performed at the decoder in an autonomous manner, that is, without the need for any data related to the final block predictor generation in this regard performed at the encoder.

Therefore, an encoder configured for performing the proposed scheme may be configured for performing the proposed method on a current pixel block to generate a predictor of such current pixel block using at least one intra prediction video coding mode selected based on a gradient analysis, and a decoder configured for performing the proposed method may be capable of generating the same predictor using the same at least one intra prediction video coding mode selected based on a gradient analysis, for decoding the current block, based on its own processing performed at the decoder, thereby alleviating the need for said decoder to receive information specifying the at least one intra prediction video coding mode selected based on a gradient analysis used at the encoder for encoding the current block, such as, for example, an intra prediction video coding mode index for the at least one intra prediction video coding mode selected based on a gradient analysis.

In order to ensure that the encoder and decoder select the same at least one intra prediction video coding mode selected based on a gradient analysis, the encoder and the decoder may be configured in some embodiments to determine the same application area, in correspondence with the same current block, that is, at the encoder, a set of pixels to be encoded, and at the decoder, the same set of pixels in the pixel matrix corresponding to the image, to be decoded. The encoder and the decoder may also be configured in some embodiments to perform the same gradient analysis, based on the same one or more pixels of the application area.

Therefore, through the selection of at least one intra prediction video coding mode based on a gradient analysis (thus according to the DIMD scheme), the proposed scheme advantageously provides a method for autonomously generating, at an encoder and at a decoder, a predictor, thereby eliminating the need to include, in the bitstream generated by the encoder, information related to the at least one intra prediction video coding mode selected based on the gradient analysis that was used for generating the final block predictor, for coding a current block of an image. This results in an improvement in the compression efficiency for a given bitrate, or in a decrease of the bitrate at the output of the encoder.

In addition, the proposed scheme advantageously provides, through the use of a combining of several predictors for the same current pixel block, strong improvements in performance in terms of bitrate gain for a given quality (for example expressed in PSNR—Peak Signal-to-Noise Ratio).

Referring again to FIG. 3b, in one or more embodiments, a decoder configured for performing a method according to the present subject disclosure may be configured, for a processing comprising a decoding of an image divided into a plurality of pixel blocks, the decoder being configured for decoding the image by sequentially decoding the pixel blocks according to a processing sequence to determine for a current pixel block an application area comprising a plurality of pixels in blocks preceding the current block in the processing sequence, perform a gradient analysis on at least two pixels of the application area, and to select at least two intra prediction video coding modes (among a plurality of intra prediction video coding modes usable for decoding the current pixel block), among which at least one is selected based on results of the gradient analysis. In some embodiments, the decoder may be configured to compute for some of the pixels, or depending on the embodiment, all pixels of the application area, a gradient representing an edge intensity level and an edge orientation at the pixel, and to select, based on at least one of the computed gradients, at least one intra prediction video coding mode among a plurality of intra prediction video coding modes usable for decoding the current block.

Depending on the embodiment, the processing sequence at the encoder (encoding sequence) may or may not be identical to the processing sequence at the decoder (decoding sequence), provided that the processing sequence is designed so that the encoder and the decoder may process pixel(s) of the same application area for each processed current block.

The video decoder may then be configured for, using the proposed method, determining intra predictors of the current block based on the at least two intra prediction video coding modes selected at the decoder, and generating a prediction of the current pixel block based on the intra predictors, which may then be used for decoding the current block.

The proposed method may therefore be performed autonomously at the encoder and at the decoder with respect to the selection of at least one intra prediction video coding mode based on a gradient analysis, and merely requires in such respect that control information indicating that the proposed method has been used by the encoder for a current block be provided to the decoder. The decoder may be configured for, upon receipt of such control information, performing the proposed method for selecting at least one intra prediction video coding mode based on a gradient analysis to be used for decoding of the current block.

Likewise the DIMD scheme, the proposed method may be implemented as a new encoding mode, or as part of a DIMD encoding mode. That is, a DIMD encoding mode may be defined to use the proposed method instead of the DIMD scheme as described above and illustrated on FIG. 3a. Alternatively, two new modes may be defined: one for the DIMD scheme, and one for an "extended DIMD" scheme as proposed in the present subject disclosure.

An encoder configured to use the proposed method for a current block of an image to be encoded, and as a consequence to autonomously select at least one intra prediction video coding mode based on a gradient analysis for the encoding of the current block, may in some embodiments be further configured to include, in the output bitstream, control data (e.g. a flag) indicating that the DIMD coding mode (or extended DIMD coding mode) has been used for encoding the current block. Alternatively, the DIMD coding mode (or extended DIMD coding mode) may be defined as an additional intra coding mode (for example, in HEVC, as a 36th intra coding mode), so that the signaling between the encoder and the decoder may be reduced through the indicating that the DIMD coding mode (or extended DIMD coding mode) has been used for encoding the current block, e.g. through a coding mode index.

An decoder configured to use the proposed method for a current block of an image to be decoded, and as a consequence to autonomously select at least one intra prediction video coding mode based on a gradient analysis for the decoding of the current block, may in some embodiments be further configured to receive in the encoded bitstream control data indicating that the DIMD coding mode (or extended DIMD coding mode) has been used for encoding the current block, and further to the reception of such control data to decode the current block using an embodiment of the proposed method according to the present subject disclosure.

In one or more embodiments, the application area may be chosen to be any set of pixels in blocks preceding the current block in the block processing sequence.

As the encoder produces a bit stream, pixels of encoded blocks may refer to pixels that have been encoded (the encoding of which generated bits in the output bit stream of the encoder), and then reconstructed by a decoding performed at the encoder side.

At the encoder, pixels of encoded blocks that have been encoded and then reconstructed may be referred to as "causal" pixels. At the decoder, pixels that have been decoded, that is, reconstructed from a bit stream generated by the encoding, may also be referred to as "causal pixels."

In each case (encoding or decoding), causal pixels may correspond to pixels in blocks preceding the current block in the block processing (encoding or decoding) sequence. At the encoder, each causal pixel may correspond to a pixel in the original image which belongs to a block preceding the current block in the encoding sequence.

In one or more embodiments, the application area may be any set of causal pixels, or when considering a so-called "causal area" comprising causal pixels (e.g. all causal pixels)j, any subset of the causal area. At the encoder, the causal area may comprise any causal pixel, that is, any pixel which has been encoded to produce bitstream data and then reconstructed at the encoder (e.g. through a decoding performed at the encoder).

For example, in some embodiments, at the encoder side, the application area may comprise pixels that have already been processed by the encoder, that is, encoded and then reconstructed (for the encoding of pixels following the encoded pixels according to an encoding sequence). At the decoder side, the application area may comprise pixels that have been reconstructed by the decoder.

At the encoder, the block processing sequence may correspond to the block encoding sequence, that is, the sequence in which the pixel blocks dividing the image to be encoded, are encoded.

At the decoder, the block processing sequence may correspond to the block decoding sequence, that is, the sequence in which the pixel blocks dividing the image to be decoded, are decoded.

As discussed above, in some embodiments the block encoding sequence and the block decoding sequence may not be identical, and if different may be designed so that they lead to the same application area for each current block of the sequences.

In some embodiments, information on the partitioning of the image to be encoded into blocks may be included in the bitstream output by the encoder, so that the same partitioning of the image may be used at the decoder for decoding the image. Likewise, information on the block encoding sequence may be included in the bitstream output by the encoder, so that the same sequence may be used at the decoder for decoding the blocks.

In such embodiments, the application area may be defined at the decoder with pixels of the original image (to be encoded), yet chosen so that they correspond to pixels which will have been decoded (reconstructed) at the encoder upon decoding of the current block.

In embodiments where the processing sequence for encoding the blocks is identical to the processing sequence for decoding the encoded blocks, any pixel reconstructed after encoding and corresponding to a pixel of the original image belonging to a block preceding a current block to be encoded will correspond to a pixel already decoded when the decoding of the corresponding current block is performed at the decoder.

Figure 3C:
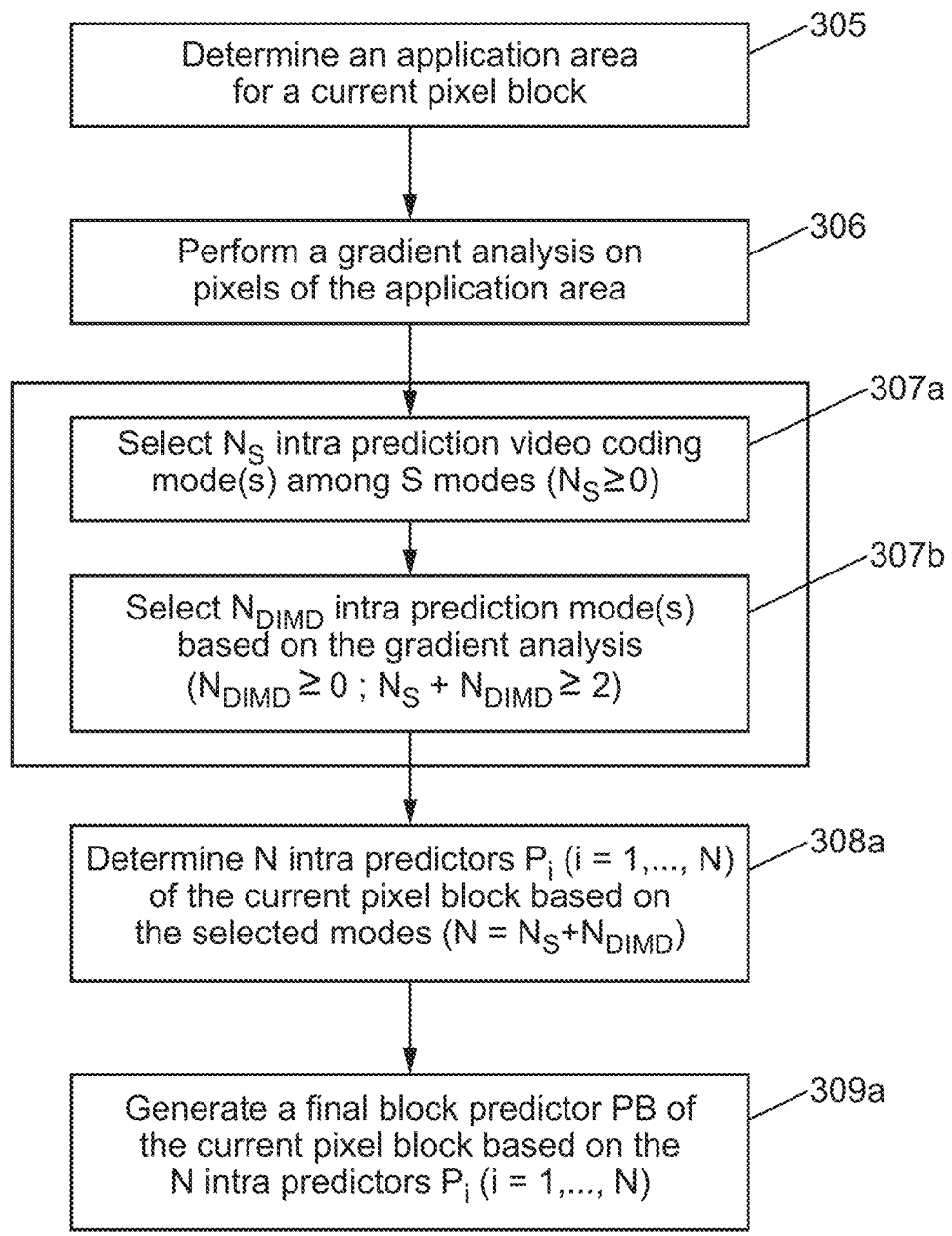
FIG. 3c is a block diagram illustrating an exemplary video processing method in accordance with one or more embodiments.

Reference is now made to FIG. 3c, which is a block schematic diagram of a method of processing an image according to embodiments of the present subject disclosure.

As described above with reference to FIG. 3b, an image to be processed according to embodiments of the proposed method may be divided into a plurality of pixel blocks, which pixel blocks are processed according to a processing sequence for purposes of encoding the image through encoding of the blocks according to the processing sequence. In addition, in one or more embodiments, for a current pixel block being encoded, an application area comprising a set of pixels in blocks preceding the current block in the processing sequence, may be determined (305) and a gradient analysis may be performed (306) on at least one pixel of the application area.

The selection of intra prediction video coding modes may in some embodiments be divided into the selection (307a) of $N_s$ ($N_s \geq 0$) intra prediction video coding mode(s) among S intra prediction video coding modes usable for processing the current pixel block, using any selection method, such as, for example, a rate distortion optimization mode selection, on the one hand, and the selection (307b) of $N_{DIMD}$ intra prediction video coding mode(s) based on the gradient analysis ($N_{DIMD} \geq \max(2-N_s, 1)$) on the other hand. $N_{DIMD}$ may be chosen greater or equal to $\max(2-N_s, 1)$ in order to ensure that at least one intra prediction video coding mode is selected based on the gradient analysis, and that at least two modes are selected, that is, the total number of selected modes ($N=N_s+N_{DIMD}$) is greater or equal to 2.

Based on the N selected intra prediction video coding modes, N predictors Pi (i=1 . . . N) are then determined (308a), and a final block predictor PB is generated (309a) based on the N predictors Pi (i=1 . . . N).

Figure 4A:
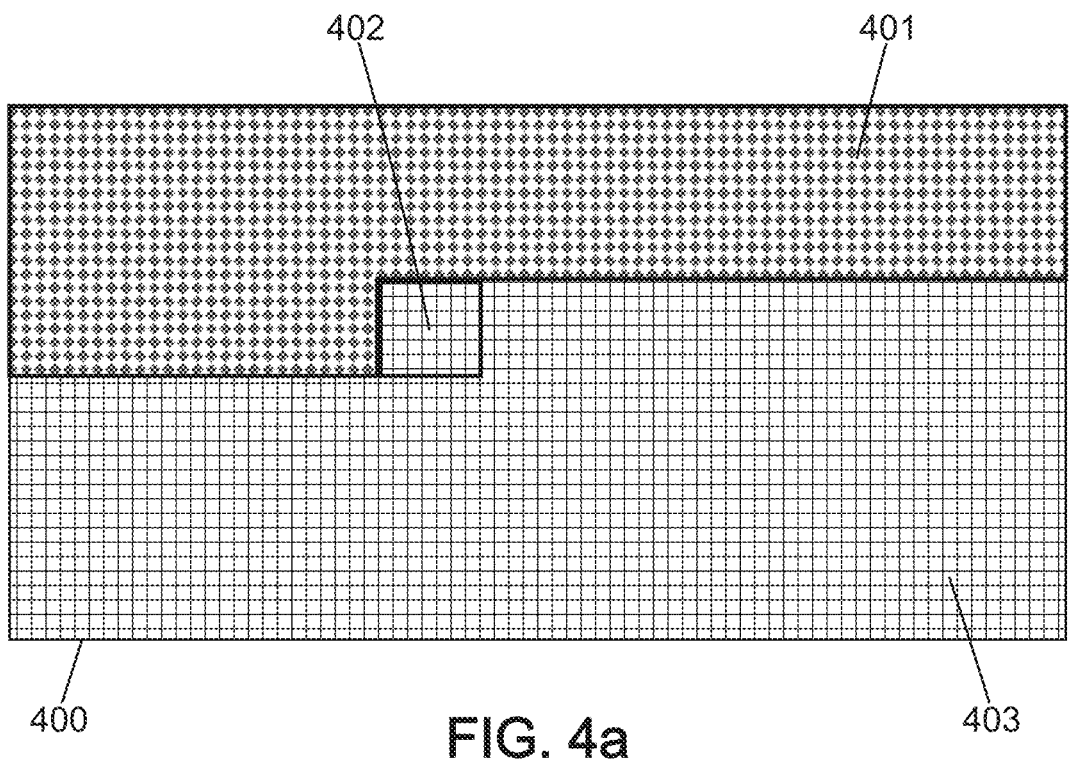
FIGS. 4a-4d illustrate exemplary application areas in accordance with one or more embodiments.

FIG. 4a illustrates an exemplary causal area, that is, an exemplary set of causal pixels (401) for an image (400), which corresponds to a current block (402) being encoded or decoded, for a raster scan type encoding/decoding sequence.

The pixels located in the third area (403) of the image are non-causal, and may preferably not be used in the implementation of the proposed method. Indeed, at the decoder side, these pixels will not have been decoded when the decoding of the current block (402) is undertaken.

In one or more embodiments, any subset of the set of causal pixels may be determined to be the application area on which a gradient analysis is performed.

Figure 4B:
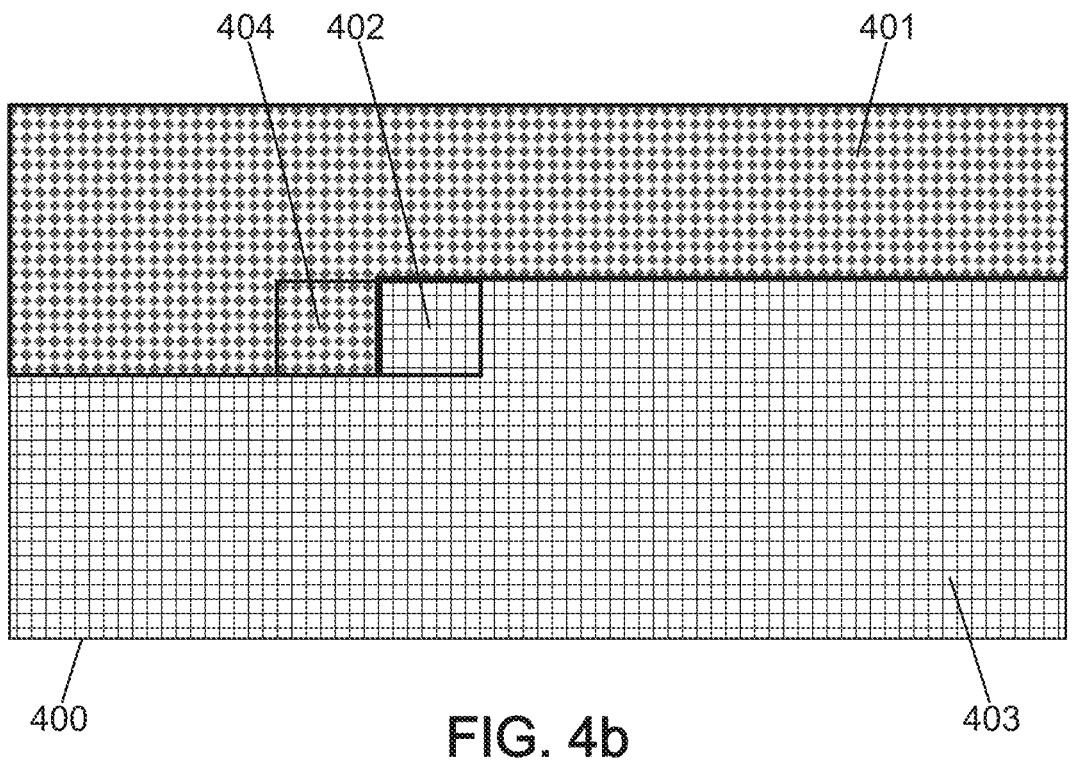
Figure 4C:
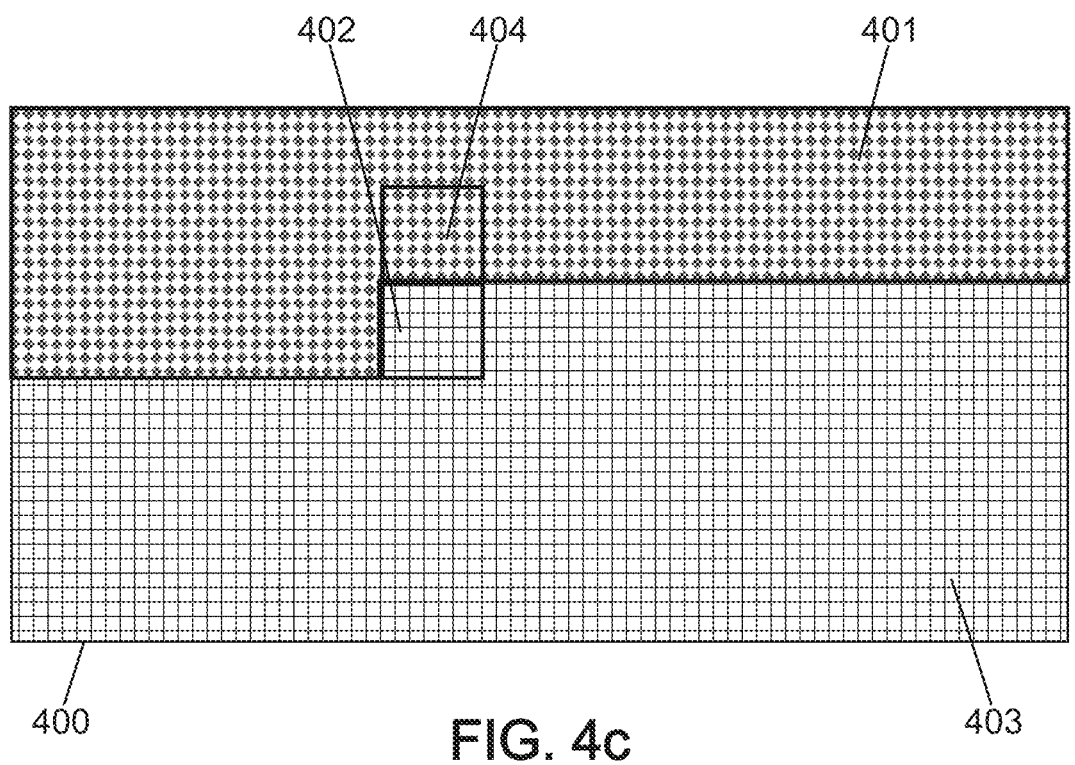
Figure 4D:
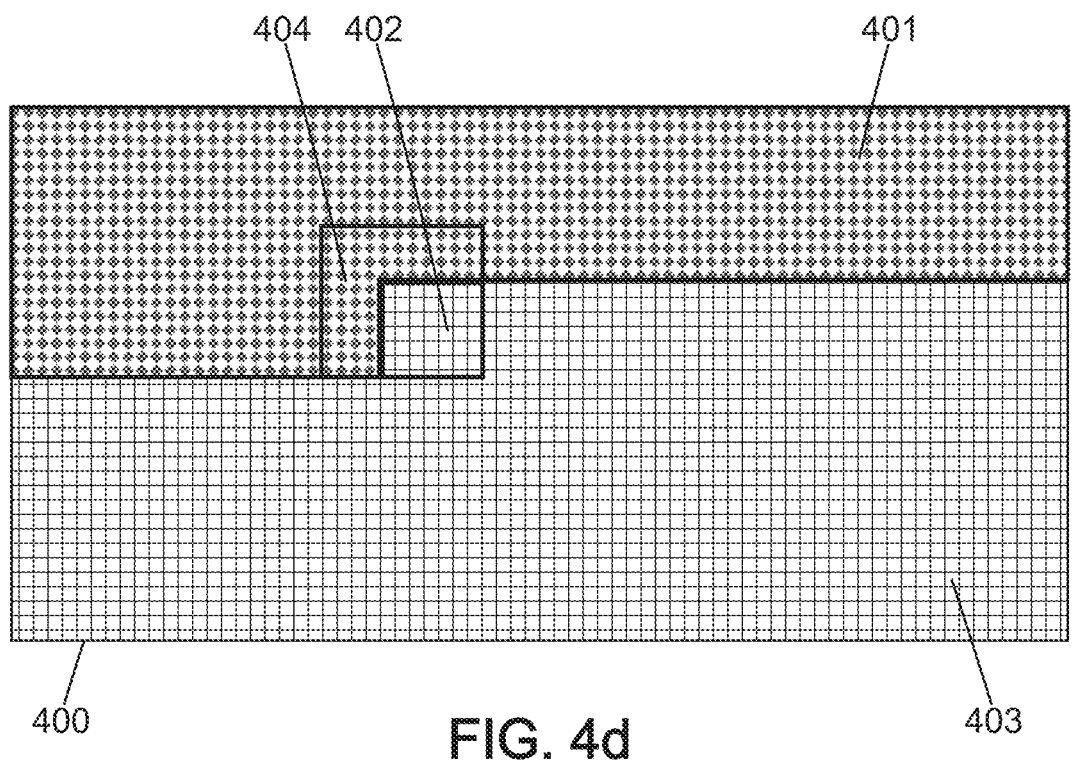

FIGS. 4b, 4c and 4d illustrate different examples of application areas (404b, 404c, 404d) determined as subsets of the causal area (401) of FIG. 4a.

The application area (404b) shown on FIG. 4b is a square-shaped set of pixels located on the left of the current block in the causal area (401).

The application area (404c) shown on FIG. 4c is a square-shaped set of pixels located above the current block in the causal area (401).

The application area (404d) shown on FIG. 4d is a L-shaped set of pixels located on the left of and above the current block in the causal area (401).

In some embodiments, a video encoder and video decoder implementing the proposed method may be configured so that the application area determined at an encoding side is identical to the application area determined at the corresponding decoding side, for each coding block of respective processing sequences.

The determining of the application area may comprise determining a shape and a size of the set of pixels belonging to one or more blocks preceding the current block in the block processing sequence.

Depending on the embodiment, a size (in number of pixels) and/or shape of the application area may be determined based on the type of gradient analysis to be performed on the application area. In some embodiments, a minimum size (that is, a minimum number of pixels) of the application area, or of sections or dimensions of the application area may be determined based on the type of gradient analysis to be performed on the application area. For example, in embodiments wherein the gradient analysis is performed using a 3×3 Sobel filter matrix, the application area will be chosen to have a width of at least 2 pixels in its different parts or sections. As another example, a width (in pixels) of the application area, or sections thereof, may be chosen based on the dimensions of a filter matrix to be used for the gradient analysis.

As a gradient analysis will be performed on the application area, the size of the application area may preferably be determined as a compromise between obtained performances (in particular coding efficiency performances) and computation complexity.

In some embodiments, the shape of the application area may be determined so that the application area does not include any disjoint set of pixels. That is, the pixels of the application area may be determined so that, except for the edge pixels (pixels located at an edge of the application area), any pixel of the application area has at least two adjacent pixels that also belong to the application area.

In other embodiments, the application area may comprise several disjoints sets of pixels. For example, the application area may be determined to be substantially L-shaped around a current block, yet without any pixels surrounding the corner of the current block. In such case, the application area may comprise two disjoint strips of pixels, for example a horizontal strip and a vertical strip, with no pixel belonging to both strips.

Hereinafter, the computation of a gradient for each pixel of the application area according to embodiments of the present subject disclosure is described in further details.

In some embodiments, the computation of a gradient at a given pixel may comprise the computation of a gradient of the intensity of the pixel, that is, of the luma value at the pixel. Such gradient provides an estimate of a direction of the greatest variation from light to dark, and of a change rate in the estimated direction. A gradient analysis performed on pixels of an image can therefore identify the points of the image where the luminosity suddenly changes, which points may be viewed as edges, and provide an estimate of an orientation of those detected edges.

A gradient analysis is typically used in image processing to characterize changes in the intensity of luma values of pixels of an image, to calculate a direction and a magnitude of such a change for a given pixel. A gradient analysis may for example be performed as part of an edge detection analysis to determine a principal angular direction for an analyzed portion of the image.

Various approaches that may be used depending on the embodiment for estimating a principal angular direction (that is, an orientation) at any given point are described below.

Edge detection methods based on derivatives have been developed, some of which generate an image gradient, on which edges present on the original image are emphasized, based on the convolving of the analyzed image portion with a filter. The filter may be a Finite Impulse Response (FIR) filter (e.g. the FIR filters proposed by Sobel or Prewitt), or an Infinite Impulse Response (IIR) filter (e.g. IIR filters based on Gaussian derivatives).

The principal angular direction estimation provided by these methods is however not optimized, as a precise estimation cannot be obtained in each point of an analyzed image portion. For example, errors can be generated for points located in the neighborhood of local extrema points, which are points the gradient is near zero and its orientation indefinite.

Other approaches, based on the use of oriented filter banks, e.g. Gabor filters, Steerable filters, may also be used, even though they are typically used for computing estimations of multiple orientations.

Orientation tensors, or structure tensors, may also be used, even though these approaches calculate spatial statistics on local gradients, which makes them somewhat unfit for the estimation of local orientation, that is, the estimation of an orientation at a given point of the image.

The gradient of a two-variable function (e.g., the image intensity function) at each image point may be computed as a two-dimensional vector, with components calculated by the derivatives in the horizontal and vertical directions. At each image point, the gradient vector points in the direction of largest possible intensity increase, and the magnitude of the gradient vector corresponds to the rate of change in that direction. The gradient is therefore zero in an area where the luma intensity is constant.

As the intensity of pixels of a digital image is a discrete function of the pixel coordinates in the pixel matrix representing the image, derivatives of such a discrete function may only be defined under an assumption that the pixels of the image (values of the discrete function) are samples of a continuous intensity function for the image which has been sampled.

In one or more embodiments, a gradient operator which uses convolution matrices may be used for the computation of the gradient. The convolution matrix may be convolved with the image for the calculation of approximate derivatives in the horizontal and vertical directions. In such embodiments, the computing the gradient may comprise the generating respective estimates of derivatives of an intensity level at the pixel in the horizontal and vertical directions by performing a convolution of a source matrix of pixels of the image with horizontal and vertical filter matrices, respectively.

For example, for a given source image A, represented by a matrix MA, two matrices MGx and MGy may be obtained based on convolutions of the matrix A with two filter matrices Mx and My, respectively corresponding to the horizontal and vertical directions. The matrices MGx and MGy may be viewed as respectively representing two images Gx and Gy, each point of which representing estimates of horizontal and vertical derivatives at the corresponding point of the image A, that is, approximate horizontal and vertical gradients (which may be viewed as approximate horizontal component and vertical component of the gradient vector) at the point:

$MGx = Mx*MA$ for the horizontal direction, and $MGy = My*MA$ for the vertical direction, where the operator * designates a matrix convolution operator.

If MA is an M×N matrix, and Mx and My are square T×T matrices (with T<M and T<N), the matrices MGx and MGy will be (M−T)×(N−T) matrices.

For each point of the image A, the generated horizontal MGx and vertical MGy gradient components can be combined to compute a first gradient value G corresponding to a norm of the gradient vector at the point, and a second gradient value θ corresponding to a direction of the gradient vector at the point, as follows:

$$G = \sqrt{MGx^2 + MGy^2},$$

and $$\theta = \operatorname{atan}\left(\frac{Gy}{Gx}\right)$$

where a tan is the arc tangent function.

In some embodiments, the first gradient value G may be used as representing an estimate magnitude of the directional change of the intensity at the point, while the second gradient value θ may be used as representing an estimate orientation of the directional change of the intensity at the pixel.

It will be appreciated by those having ordinary skill in the relevant art that any suitable method for computing a gradient representing a directional change of an intensity at a pixel of the image, such as, for example, edge detection methods, orientation tensor methods, filter bank methods, may be used in place of the above-described convolution matrix method which is given by way of example only.

In one or more embodiments, the gradient computed for a pixel of the application area may be mapped to an intra prediction mode among the plurality of intra prediction video coding modes usable, at the encoder, for encoding the current block, or, at the decoder, for decoding the current block.

In some embodiments, the second gradient value computed for a pixel of the application area, which represents an estimate orientation of the directional change of the intensity at the pixel, may be used to perform this mapping, by mapping this second gradient value to a directional intra prediction mode among the plurality of intra prediction video coding modes usable for encoding or decoding the current block.

In one or more embodiments, the mapping may be performed according to the following formula, in the exemplary case of an HEVC encoder:

$$M = \frac{33 \times (\theta - 0.75\pi)}{\pi} + 2$$

where θ is the second gradient value, and M is the intra prediction mode, among the 35 HEVC intra prediction modes, mapped with the value θ.

More generally, the mapping may be performed according to the following formula, where N is the number of intra prediction modes available at the encoder for encoding the input video data:

$$M = \frac{(N-2) \times (\theta - 0.75\pi)}{\pi} + 2$$

For example, in the case of the VVC standard for which 67 intra prediction modes are currently being considered, the mapping may be performed according to the following:

$$M = \frac{65 \times (\theta - 0.75\pi)}{\pi} + 2$$

In one or more embodiments, the selecting of the at least one intra prediction video coding mode based on a gradient analysis may further comprise the determining of respective weight values for several intra prediction modes among the plurality of intra prediction video coding modes, based on gradients computed for pixels of the application area. Depending on the embodiment, respective weight values may be determined for each of the plurality of intra prediction video coding modes available at the encoder and at the decoder.

In some embodiments, the above-described mapping of each computed gradient with an intra prediction mode may be used for determining the weight value associated with the intra prediction mode. That is, the weight value for an intra prediction video coding mode may be determined based on the one or more computer gradient mapped to the intra prediction video coding mode.

For example, the direction information obtained for each pixel of the application area through computation of the gradient may advantageously be used for the determination of the weights of intra prediction video coding modes via the mapping of computed second gradient values with intra prediction video coding modes.

In some embodiments, the weight value for an intra prediction video coding mode may be determined by combining respective first gradient values of computed gradients mapped to the intra prediction video coding mode. The mapping based on second gradient values of such computed gradients may for example be used.

For example, in some embodiments the first gradient values of computed gradients for which the respective second gradient values have been mapped to the same intra prediction video coding mode may be combined (e.g. summed) to obtain a weight value for that intra prediction video coding mode. In such cases, since second gradient values may be used to associate a computed gradient with a directional intra prediction video coding mode, non-directional intra prediction video coding modes may have a zero weight.

Once weight values have been determined for several intra prediction video coding mode, a set of selectable intra prediction video coding modes based on the gradient analysis may in some embodiments be defined as comprising the intra prediction video coding modes for which a weight value has been determined, or in other embodiments be defined as comprising only the intra prediction video coding modes for which a non-zero weight value has been determined. Depending on the embodiment, the set of selectable intra prediction video coding modes based on the gradient analysis may comprise all of the intra prediction video coding modes usable for encoding and/or decoding the current block, or only a subset thereof.

In one or more embodiments, an intra prediction video coding mode may be selected based on the gradient analysis in the set of selectable intra prediction video coding modes based on the respective weight values of the intra prediction video coding modes of the set.

Any selection criterion for selection of an intra prediction video coding mode among the selectable intra prediction video coding modes based on the gradient analysis that leads to the same selection result, whether the selection is performed at the encoder on the original image or at the decoder an a reconstructed image, may be used for performing the selection.

For example, a selection criterion according to which the intra prediction video coding mode with the greatest weight is selected based on the gradient analysis may be used in some embodiments. In another example, a selection criterion according to which a plurality of intra prediction video coding modes with the greatest respective weights are selected based on the gradient analysis may be used in some embodiments.

This selection criterion may also be refined in some embodiments with additional conditions to be met for fulfilling the criterion. In the case where no intra prediction mode available at the encoder satisfies the criterion, a default selection can be used to select a predetermined intra prediction mode (e.g. the DC intra prediction mode described above).

In one or more embodiments, a weight value histogram may be generated for purposes of selecting at least one intra prediction video coding mode based on a gradient analysis, based on the gradient computed for each pixel of the application area. In the following, such histogram may be indifferently referred to as a "gradient-based histogram," or a "histogram of gradients," or "HoG."

Figure 5:
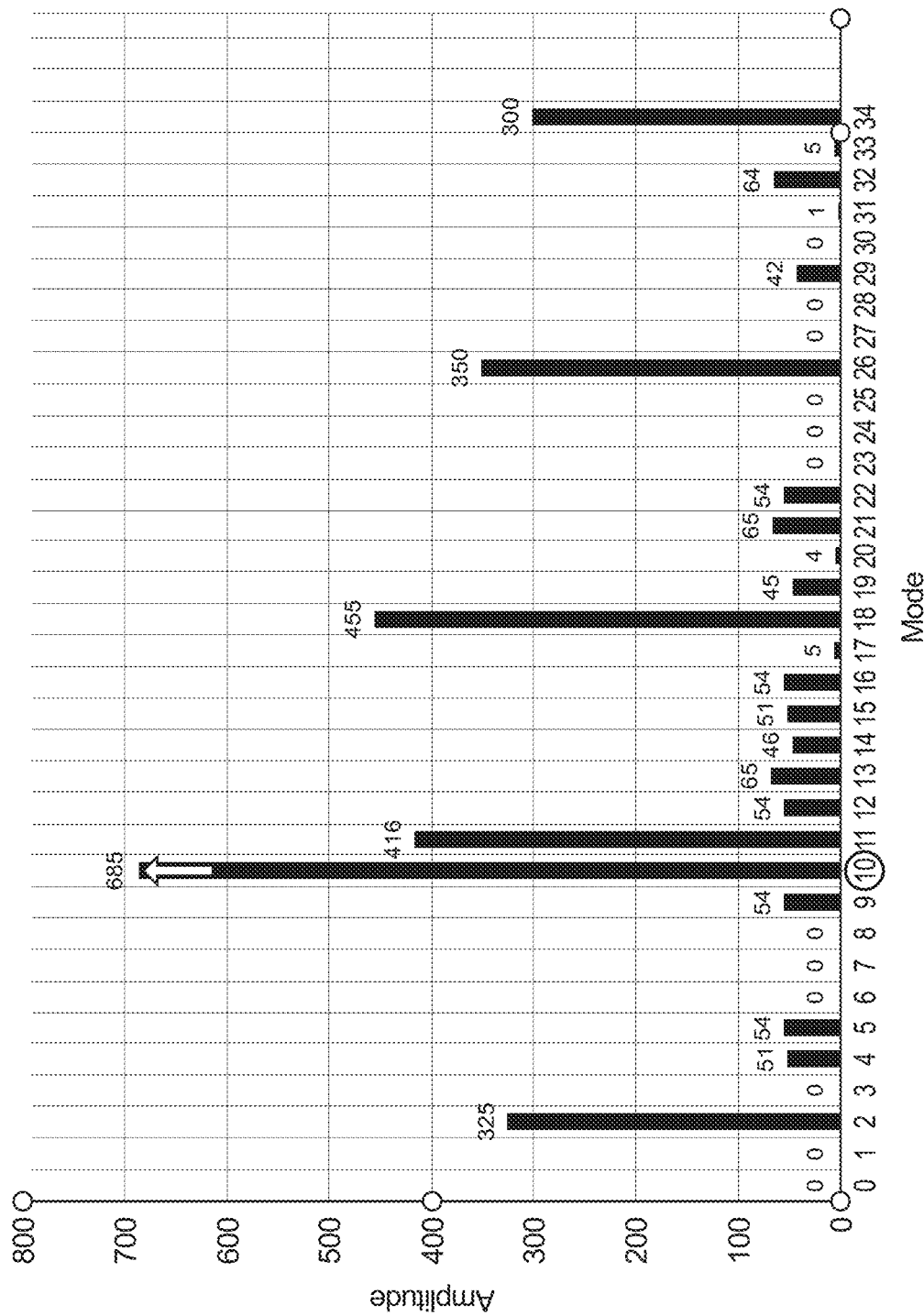
FIG. 5 shows a histogram of intra prediction video coding modes in accordance with one or more embodiments.

For example, such histogram may comprise the weight value calculated for each intra prediction video coding mode, as illustrated on FIG. 5 in the case of an HEVC codec.

Referring to FIG. 5, in embodiments where only one intra prediction video coding mode is to be selected based on the gradient analysis, such intra prediction video coding mode may be selected based on the histogram of gradient, for example using a greatest value criterion. In the example illustrated on FIG. 5, the intra prediction video coding mode of index 10 would be selected to be used for the processing of the current pixel block. In embodiments where two intra prediction video coding modes are to be selected based on the gradient analysis, such intra prediction video coding modes may be selected based on the histogram of gradient, for example using the greatest value criterion. In the example illustrated on FIG. 5, the intra prediction video coding modes of index 10 and of index 18 would be selected to be used for the processing of the current pixel block. In embodiments where three intra prediction video coding modes are to be selected based on the gradient analysis, such intra prediction video coding modes may be selected based on the histogram of gradient, for example using the greatest value criterion. In the example illustrated on FIG. 5, the intra prediction video coding modes of index 10, of index 18, and of index 11 would be selected to be used for the processing of the current pixel block. More generally, in some embodiments, the NDIMD intra prediction video coding modes selected based on a gradient analysis may be selected as respectively corresponding to the NDIMD largest values of the histogram.

In one or more embodiments, the selection of an intra prediction video coding mode based on a histogram of gradients may be performed subject to a condition related to the histogram of gradients. For example, in some embodiments, only intra prediction video coding modes with a histogram value larger than a given threshold may be selected. The threshold may be set to be a value proportional to the largest value of the histogram or to the second largest value of the histogram. For example, let V be the second largest value of the histogram, only intra prediction modes having a histogram value larger than V·T, where T is a weight value that may for example be chosen in the range $0 < T \leq 1$ (or $0 < T \leq \frac{1}{2}$), may be selected.

Alternatively, already selected intra prediction video coding modes based on a histogram of gradients may be discarded from the selection if their histogram value is not above a given threshold. The threshold may also be set to be a value proportional to the largest value of the histogram or to the second largest value of the histogram. For example, let V be the second largest value of the histogram, intra prediction modes having a histogram value larger than V·T, where T is a weight value that may for example be chosen in the range $0 < T \leq 1$ (or $0 < T \leq \frac{1}{2}$), may be discarded from the set of intra prediction video coding modes selected based on the gradient analysis. In such case, the number of intra prediction video coding modes selected based on a gradient analysis ($N_{DIMD}$) may in some embodiments be reduced (to $N'_{DIMD}$), possibly to the benefit of an increased number of intra prediction video coding modes that are selected, however not based on the gradient analysis ($N_s$). In the cases where $N_s$ is set to 0, only $N'_{DIMD}$ predictors may be determined, with the advantage that such reduced set of predictors based on which the final block predictor is computed are determined as reliable. Alternatively, the threshold may be adjusted, possibly dynamically, for example in order to accommodate a predefined number of intra prediction video coding modes to be selected based on a gradient analysis ($N_{DIMD}$).

The discarding of intra prediction video coding modes advantageously avoid processing predictors which are determined as unreliable.

In some embodiments, for each pixel of the application area, a first gradient value representing an estimate magnitude of the directional change of the intensity at the pixel, and a second gradient value representing an estimate orientation of the directional change of the intensity at the pixel may be computed as part of the computation of a gradient for the pixel. The second gradient value may be used to map the computed gradient to an intra prediction video coding mode. That is, the second gradient value may be used to identify an intra prediction video coding mode corresponding to the computed gradient.

For each intra prediction video coding mode, a weight value may be calculated by combining the first gradient values of the computed gradients mapped to the intra prediction video coding mode. In embodiments where the first gradient values are added to each other, the resulting weight value of the intra prediction video coding mode is increased with the first gradient value of each computed gradient mapped to the intra prediction video coding mode.

Once all the pixels of the application area have been processed according to the proposed method, and given that the weighting of intra prediction video coding modes is cumulative, a histogram of weight values for the corresponding intra prediction video coding modes provides an efficient way to select an intra prediction video coding mode that is representative of the entire current block. As a result, the at least one intra prediction video coding mode selected based on a gradient analysis according to the proposed method may be used for the prediction encoding of all the pixels of the current block.

Hereinafter an exemplary embodiment of a gradient analysis according to the proposed method is described as illustrated on FIGS. 6a and 6b.

In this exemplary embodiment, an application area (601) is determined as a set of pixels located on the left and above the current block (602). In this example, the application area surrounds the current block with a T-pixels wide band along the left side of the current block (602), and a T-pixel wide band along the upper side of the current block (602).

For example, the T parameter may be chosen equal to 2, 4, or 8. The value T=2 offers a good compromise between coding efficiency and additional computation complexity at the decoder. Note that the increase of computational complexity is a more salient concern at the decoder side, because a decoder would have to support the extended DIMD mode as long as it is configured to decode any bit stream that is output by an encoder which may have used the extended DIMD mode to encode input video data. At the encoder side, it may be chosen to not use the extended DIMD mode.

The gradient analysis performed on this application area may use a Sobel filter of size 3×3, which provides good results in view of the simplicity of its implementation.

The computation of the intensity gradient for a pixel of the application area may be performed based on the following two filter matrices Mx and My respectively corresponding to the horizontal and vertical directions:

$$Mx = \begin{bmatrix} -1 & 0 & 1 \\ -2 & 0 & 2 \\ -1 & 0 & 1 \end{bmatrix} \text{ and } My = \begin{bmatrix} -1 & -2 & 1 \\ 0 & 0 & 0 \\ 1 & 2 & 1 \end{bmatrix}$$

As described above, for a given source image A, represented by a matrix MA, two matrices MGx and MGy may be obtained based on convolutions of the matrix A with Mx and My, as follows:

$MGx = Mx*MA$ and $MGy = My*MA$

Hereinafter is provided an numerical example of calculation of the MGx and MGy matrices.

Let MA be the following matrix.

$$MA = \begin{bmatrix} 15 & 12 & 65 & 94 \\ 30 & 20 & 29 & 27 \\ 10 & 20 & 6 & 3 \\ 20 & 20 & 40 & 49 \end{bmatrix}$$

And let Mx and My be the 3×3 Sobel matrices described above. In that case, MGx and MGy will be:

$$MGx = \begin{bmatrix} -15 - 30 \times 2 - 10 + 65 + 29 \times 2 + 6 & -12 - 20 \times 2 - 20 + 94 + 27 \times 2 + 3 \\ -30 - 10 \times 2 - 20 + 29 + 6 \times 2 + 40 & -20 - 20 \times 2 - 20 + 27 + 3 \times 2 + 49 \end{bmatrix}$$

$$MGx = \begin{bmatrix} 44 & 79 \\ 11 & 2 \end{bmatrix}$$

$$MGy = \begin{bmatrix} -15 - 12 \times 2 - 65 + 10 + 20 \times 2 + 6 & -12 - 65 \times 2 - 94 + 20 + 6 \times 2 + 3 \\ -30 - 20 \times 2 - 29 + 20 + 20 \times 2 + 40 & -20 - 29 \times 2 - 27 + 20 + 40 \times 2 + 49 \end{bmatrix}$$

$$MGx = \begin{bmatrix} 44 & 79 \\ 11 & 2 \end{bmatrix}$$

The Sobel filter is advantageous in that it only uses, for the calculation of a gradient at a given point, 3×3 neighbor pixels located around said given point. I addition, the numbers used for the calculation of the gradient are integers. As a consequence, this filter can be implemented in software as well as in hardware. Only 8 points located around the point for which the gradient is calculated are used for the calculation of the gradient, as illustrated on FIG. 6b, which shows 8 neighbor pixels located around a current pixel for which a gradient computation is performed.

An intra prediction video coding mode can then be selected based on weight values calculated for each available intra prediction video coding modes, for example using a maximum weight criterion as described above.

Referring back to FIG. 3c, various embodiments can be derived from the general scheme illustrated on FIG. 3c, of which a few examples are provided here-below:

Exemplary Embodiment 1: NS=0, NDIMD≥2, Averaging

In the first exemplary embodiment of the proposed method, all the selected intra prediction video coding modes are selected based on a gradient analysis ($N_S=0$, $N_{DIMD} \geq 2$). For example, $N_{DIMD}$ intra prediction modes are selected based on the $N_{DIMD}$ largest HoG values. $N_{DIMD}$ predictors $P_i$ (i=1 ... $N_{DIMD}$) are then computed using the $N_{DIMD}$ selected intra prediction video coding modes. The final predictor PB is computed as a pixel to pixel average of predictors $P_i$ (i=1 ... $N_{DIMD}$): $P_B$=sum $(P_i)/N_{DIMD}$, (i=1 ... $N_{DIMD}$). This specific exemplary embodiment is illustrated on FIG. 7a, which shows an application area (701) partially surrounding a pixel block currently under processing (702). A gradient analysis is performed on pixels of the application area (701), which leads to a histogram of gradients (703) as described above. In the illustrated example, at least three intro prediction modes are selected, that each correspond to a value of the histogram (703). As shown on FIG. 3, the $N_{DIMD}$ selected modes may correspond to the $N_{DIMD}$ highest values of the histogram. Based on the selected modes, NDIMD predictors are computed: "Predictor 1," "Predictor 2," ..., "Predictor N." The $N_{DIMD}$ computed predictors are combined through a weighted average to compute a block predictor for the current block (702).

Exemplary Embodiment 2: $N_S=0$, $N_{DIMD} \geq 2$, Weighted Sum by a Function of HoG Values In the second exemplary embodiment of the proposed method, all the selected intra prediction video coding modes are selected based on a gradient analysis ($N_S=0$, $N_{DIMD} \geq 2$). For example, $N_{DIMD}$ intra prediction modes are selected based on the $N_{DIMD}$ largest HoG values. $N_{DIMD}$ predictors $P_i$ (i=1 ... $N_{DIMD}$) are then computed using the $N_{DIMD}$ selected intra prediction video coding modes. For i=1 ... NDIMD, Wi is assumed to be the value of the HoG that corresponds to the Pi computed based thereon. Let f be a function, such as for example identity, square root, logarithm. In this exemplary embodiment, the final predictor $P_B$ is computed as a pixel-to-pixel weighted sum of predictors $P_i$ (i=1 ... $N_{DIMD}$): $P_B$=sum $(f(W_i) \cdot P_i)/\text{sum}(f(W_i))$, (i=1 ... $N_{DIMD}$).

Exemplary Embodiment 3: $N_S=0$, $N_{DIMD} \geq 2$, Addition of HoG-Dependent Constraints In the third exemplary embodiment of the proposed method, all the selected intra prediction video coding modes are selected based on a gradient analysis ($N_S=0$, $N_{DIMD} \geq 2$). For example, $N_{DIMD}$ intra prediction modes are selected based on the $N_{DIMD}$ largest HoG values. $N_{DIMD}$ predictors $P_i$ (i=1 ... $N_{DIMD}$) are then computed using the $N_{DIMD}$ selected intra prediction video coding modes.

In this embodiment, some selected intra prediction video coding modes may be discarded if they don't fulfill a predetermined condition. For example, assuming that all intra prediction video coding modes are selected based on a corresponding HoG value, some selected intra prediction video coding modes may be discarded if their corresponding HoG value is below a predetermined threshold.

For example, let V be the second largest HoG value of the selected intra prediction modes. Any intra prediction mode for which the corresponding HoG value is lower than V·T, where T is an arbitrary constant, may be cancelled, that is, discarded from the set of selected modes. In some embodiments, T may be chosen equal to 0.5, in a range running from 0.5 to 1, or between 0 and 1: $0<T\leq 1$.

Let N'DIMD be the new number of intra predictors: $2\leq N'DIMD\leq NDIMD$. The N'DIMD predictors Pi (i=1 . . . N'DIMD) may be computed using the N'DIMD selected intra prediction video coding modes, and the final predictor PB may be computed as a mathematical function of predictors Pi (i=1 . . . N'DIMD).

In this example, a constraint is added on the HoG value in order to avoid blending with predictors which are determined as unreliable.

Exemplary Embodiment 4: $NS\geq 1$, $NDIMD\geq 1$

In the fourth exemplary embodiment of the proposed method, at least one of the selected intra prediction video coding modes is selected based on a gradient analysis, and at least one selected mode is selected based on another scheme, such as for example rate distortion optimization ($NS\geq 1$, $NDIMD\geq 1$). For example, the NDIMD intra prediction modes are selected based on the NDIMD largest HoG values.

Assuming that NS intra prediction modes among S are selected using any method, as for example rate distortion optimization, the respective indices of these NS intra prediction modes need to be transmitted to the decoder.

The N=NS+NDIMD predictors Pi (i=1 . . . N) are then computed using the N selected intra prediction video coding modes, and the final block predictor PB is computed as a mathematical function of Pi (i=1 . . . N).

Exemplary Embodiment 5: $NS\geq 1$, $NDIMD\geq 1$, No Duplicates

In the fourth exemplary embodiment of the proposed method, at least one of the selected intra prediction video coding modes is selected based on a gradient analysis, and at least one selected mode is selected based on another scheme, such as for example rate distortion optimization ($N_S\geq 1$, $N_{DIMD}\geq 1$). For example, the $N_{DIMD}$ intra prediction modes are selected based on the $N_{DIMD}$ largest HoG values.

Assuming that NS intra prediction modes among S are selected using any method, as for example rate distortion optimization, the respective indices of these NS intra prediction modes need to be transmitted to the decoder.

In this exemplary embodiment, the selection of intra prediction video coding modes may be enhanced by discarding any duplicate mode in the NDIMD intra prediction modes and Ns intra prediction modes.

For example, each of the NDIMD intra prediction modes may be selected based on the largest HoG values, provided that an identical mode has not already been selected in the Ns selected intra prediction modes. In the case where an intra prediction mode initially selected based on the HoG is discarded, it may be replaced with another intra prediction mode selected based on the HoG (e.g. based on a different HoG value).

The N=NS+NDIMD predictors Pi (i=1 . . . N) are then computed using the N selected intra prediction video coding modes, and the final block predictor PB is computed as a mathematical function of Pi (i=1 . . . N).

This exemplary embodiment advantageously avoids the blending of identical predictors.

Exemplary Embodiment 6: NS=0, $NDIMD\geq 2$, Addition of Decoding Process-Dependent Constraints In some embodiments, constraints other than HoG-related constraints (as illustrated in the third exemplary embodiment) may be taken into account, in addition to or as an alternative to HoG-related constraints. For example, constraints related to the decoding process (e.g. to the block size) may be accounted for when generating the final block predictor.

For example, in the sixth exemplary embodiment of the proposed method, all the selected intra prediction video coding modes are selected based on a gradient analysis (NS=0, $NDIMD\geq 2$). For example, NDIMD intra prediction modes are selected based on the NDIMD largest HoG values. NDIMD predictors Pi (i=1 . . . NDIMD) are then computed using the NDIMD selected intra prediction video coding modes.

The parameter NDIMD may be chosen as a function of the current block B size. For example, let size=max(block width, block height) and NDIMD=2+log 2(size).

The NDIMD intra prediction mode may be selected with the largest HoG values. Then the NDIMD predictors Pi (i=1 . . . NDIMD) may be computed using the NDIMD selected intra prediction video coding modes, and the final predictor PB may be computed as a pixel-to-pixel average of predictors Pi (i=1 . . . NDIMD): PB=sum (Pi)/NDIMD, (i=1 . . . NDIMD).

Figure 7A:
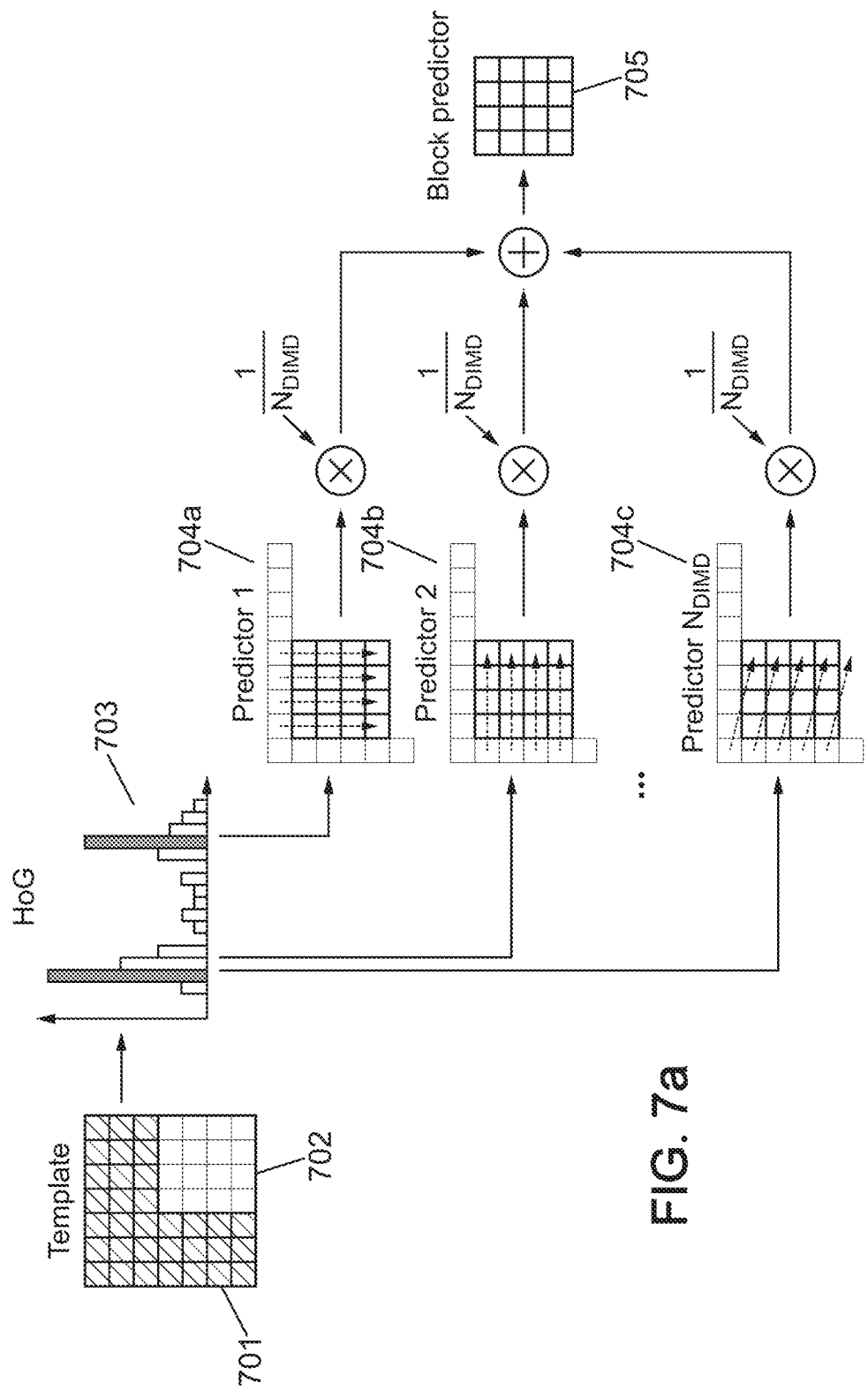
FIGS. 7a and 7b illustrate embodiments of the proposed method.
Figure 7B:
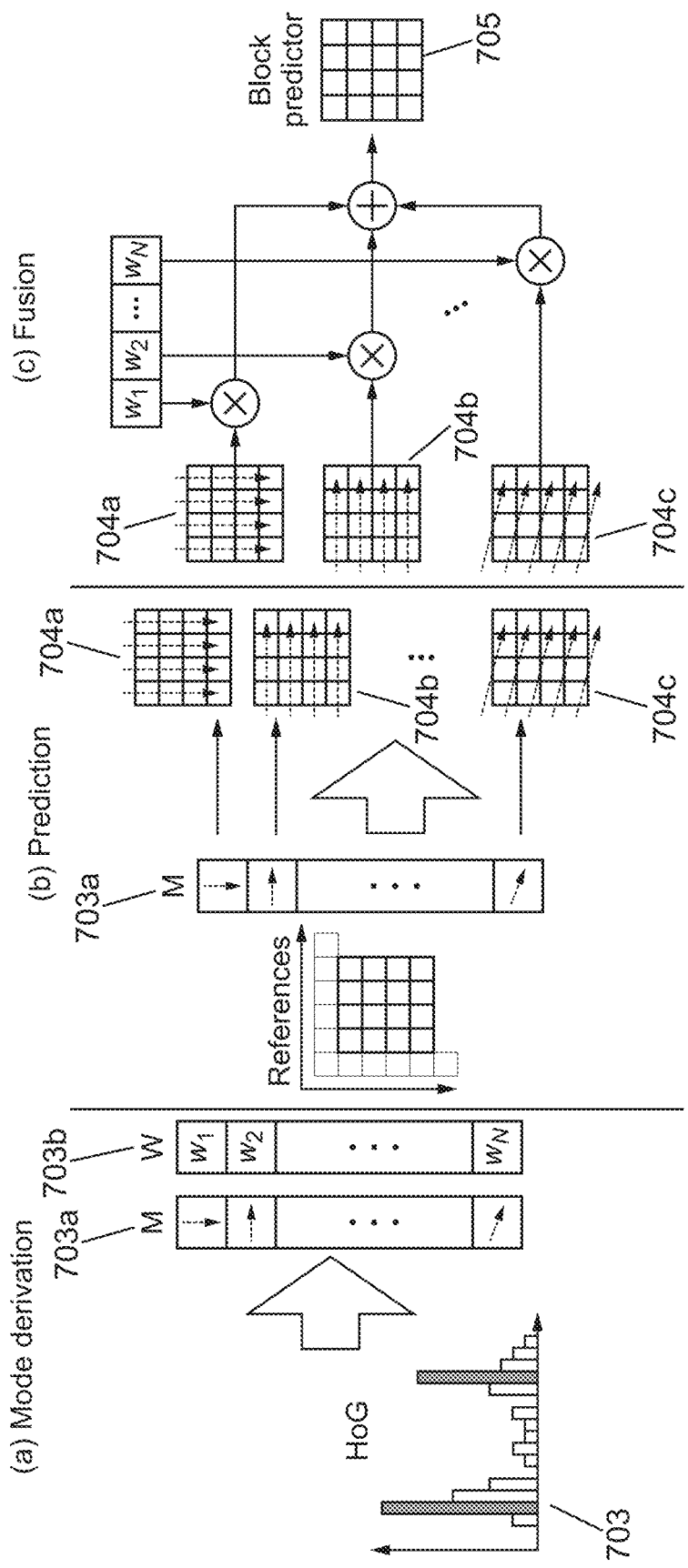

FIGS. 7a and 7b illustrate embodiments of the proposed method.

Shown on FIG. 7a is a current pixel block (702) for which an application area ("template") (701) has been determined. A histogram of gradients (HoG) (703) is computed, and three predictors (704a, 704b, 704c) are determined based on the three greatest values of the histogram (703). In the illustrated example, NDMID=3. The determined predictors are combined using a weighted average to generate a final block predictor (705) for the current pixel block.

Shown on FIG. 7b is a mode derivation (DIMD) phase (a) which comprises the generation of a histogram of gradients (HoG) (703), based on which a set of intra prediction video coding modes (703a) are selected based on their respective weights (703b) in the histogram (703). A vector of selected of intra prediction video coding modes (703a), and a vector of corresponding weight values (w1, w2, . . . , wN) in the histogram (703b), are generated as result of the mode derivation phase (a).

The exemplary embodiment illustrated on FIG. 7b corresponds to a case where the N selected modes are all selected based on the histogram that is, based on a gradient analysis. In embodiments where at least one mode is not selected based on the gradient analysis ($Ns\geq 1$), weight values wj may be predefined for those modes which are not selected based on the gradient analysis.

A prediction phase (b) comprises the computation of a predictor (704a, 704b, 704c) for each of the intra prediction video coding modes (703a) selected based on the histogram (703) as a result of the mode derivation phase.

A fusion phase (c) comprises the combining of the computed predictors (704a, 704b, 704c), each predictor Pi (i=1, . . . , NDIMD) being assigned the weight wi determined for the corresponding mode during the mode derivation phase (a) (vector (703b) of weight values (w1, w2, . . . , wN)), in order to generate a final block predictor (705) of a current pixel block using a weighted sum of the predictors Pi (i=1, . . . , NDIMD).

Figure 8:
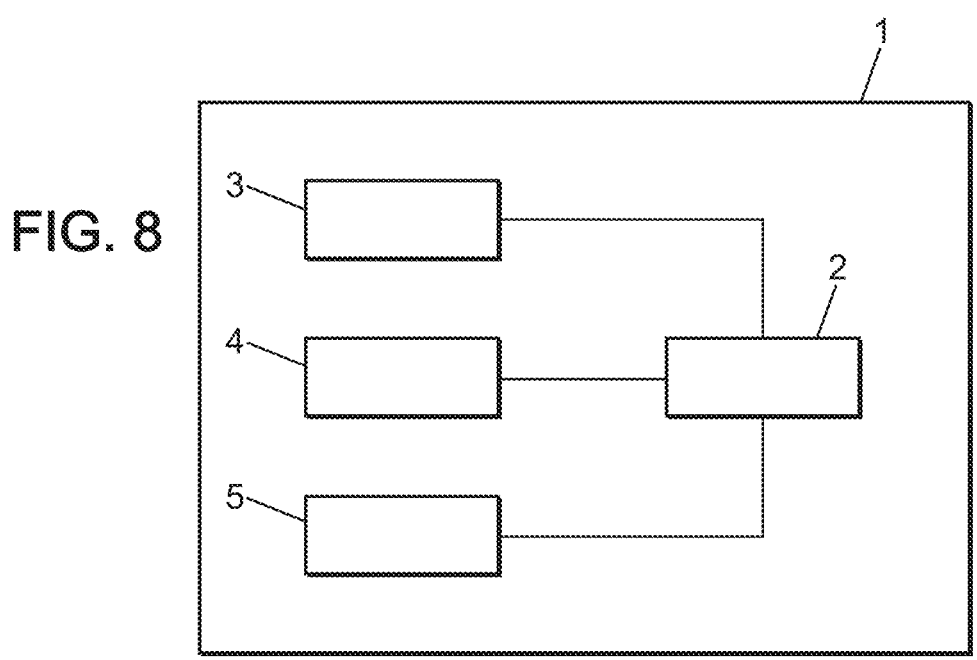
FIG. 8 illustrates an exemplary video encoder and/or decoder according to one or more embodiments.

FIG. 8 illustrates an exemplary video coding and/or decoding apparatus or unit 1 configured to use an image processing feature in accordance with embodiments of the present subject disclosure.

The apparatus 1, which may comprise one or more computers, includes a control engine 2, a video compression engine 3, a data communication engine 4, a memory 5, and a power supply (e.g., a battery, plug-in power supply, etc.) (not represented on the figure).

In the architecture illustrated on FIG. 8, all of the video compression engine 3, data communication engine 4, and memory 5 are operatively coupled with one another through the control engine 2.

In one embodiment, the video compression engine 3 is configured to perform various aspects of embodiments of the proposed method for network management as described herein.

In one embodiment, the data communication engine 4 is configured to receive input video data and output an encoded bit stream, and process received input video data in the case of an encoder, and configured to receive an encoded bit stream and output decoded video data, and process received encoded bit stream in the case of an decoder.

The control engine 2 includes a processor, which may be any suitable microprocessor, microcontroller, Field Programmable Gate Arrays (FPGA), Application Specific Integrated Circuits (ASIC), Digital Signal Processing chip, and/or state machine, or a combination thereof. According to various embodiments, one or more of the computers can be configured as a multi-processor computer having multiple processors for providing parallel computing. The control engine 2 may also comprise, or may be in communication with, computer storage media, such as, without limitation, the memory 5, capable of storing computer program instructions or software code that, when executed by the processor, causes the processor to perform the elements described herein. In addition, the memory 5 may be any type of data storage computer storage medium, capable of storing a data structure representing a computer network to which the apparatus 1 belongs, coupled to the control engine 2 and operable with the data communication engine 4 and the video compression engine 3 to facilitate management and processing of video data stored in association therewith.

In embodiments of the present subject disclosure, the apparatus 1 is configured for performing the image processing methods described herein.

It will be appreciated that the apparatus 1 shown and described with reference to FIG. 8 is provided by way of example only. Numerous other architectures, operating environments, and configurations are possible. Other embodiments of the node may include fewer or greater number of components, and may incorporate some or all of the functionality described with respect to the apparatus components shown in FIG. 8. Accordingly, although the control engine 2, video compression engine 3, data communication engine 4, and memory 5 are illustrated as part of the apparatus 1, no restrictions are placed on the location and control of components 2-5. In particular, in other embodiments, components 2-5 may be part of different entities or computing systems.

The proposed method may be used for the processing, for purposes of encoding or compression, or decoding or decompression, of input data which may correspond, depending on the embodiment, to an image, a picture, a video frame, or video data.

While the disclosure has been described with respect to preferred embodiments, those skilled in the art will readily appreciate that various changes and/or modifications can be made to the disclosure without departing from the spirit or scope of the disclosure as defined by the appended claims.

Although this disclosure has been disclosed in the context of certain preferred embodiments, it should be understood that certain advantages, features and aspects of the systems, devices, and methods may be realized in a variety of other embodiments. Additionally, it is contemplated that various aspects and features described herein can be practiced separately, combined together, or substituted for one another, and that a variety of combination and sub-combinations of the features and aspects can be made and still fall within the scope of the disclosure. Furthermore, the systems and devices described above need not include all of the modules and functions described in the preferred embodiments.

Information and signals described herein can be represented using any of a variety of different technologies and techniques. For example, data, instructions, commands, information, signals, bits, symbols, and chips can be represented by voltages, currents, electromagnetic waves, magnetic fields or particles, optical fields or particles, or any combination thereof.

Depending on the embodiment, certain acts, events, or functions of any of the methods described herein can be performed in a different sequence, may be added, merged, or left out all together (e.g., not all described acts or events are necessary for the practice of the method). Moreover, in certain embodiments, acts or events may be performed concurrently rather than sequentially.

The invention claimed is:

1. A method comprising, by a processor of an encoder side:
performing a Derived Intra Mode at Decoder (DIMD) image processing method for processing a current pixel block of an image; and
providing, to a decoder side, control information indicating that the DIMD image processing method has been used by the encoder side for processing the current pixel block of the image,
wherein the image is divided into a plurality of pixel blocks which are processed according to a processing sequence,
and wherein the DIMD image processing method comprises, for the current pixel block of the image:
determining an application area comprising a set of pixels in blocks preceding the current pixel block in the processing sequence;
performing a gradient analysis on at least one pixel of the application area;
selecting at least two intra prediction video coding modes among a plurality of intra prediction video coding modes usable for processing the current pixel block, wherein at least one of the selected intra prediction video coding modes is selected based on the gradient analysis;
determining a plurality of predictors of the current pixel block based on the at least two selected intra prediction video coding modes; and
generating a predictor of the current pixel block based on the determined plurality of predictors.

2. A method comprising, by a processor of a decoder side:
receiving, from an encoder side, control information indicating that a Derived Intra Mode at Decoder (DIMD) image processing method has been used by the encoder side for processing a current pixel block of an image; and performing the DIMD image processing method for processing the current pixel block of the image;
wherein the image is divided into a plurality of pixel blocks which are processed according to a processing sequence,
and wherein the DIMD image processing method comprises, for the current pixel block of the image:
determining an application area comprising a set of pixels in blocks preceding the current pixel block in the processing sequence;
performing a gradient analysis on at least one pixel of the application area;
selecting at least two intra prediction video coding modes among a plurality of intra prediction video coding modes usable for processing the current pixel block, wherein at least one of the selected intra prediction video coding modes is selected based on the gradient analysis;
determining a plurality of predictors of the current pixel block based on the at least two selected intra prediction video coding modes; and
generating a predictor of the current pixel block based on the determined plurality of predictors.

3. The method according to claim 2, wherein the DIMD image processing method further comprises: determining an application area comprising a plurality of pixels in blocks preceding the current pixel block in the processing sequence; and performing the gradient analysis on at least two pixels of the application area.

4. The method according to claim 2, wherein the DIMD image processing method further comprises: determining weights that are respectively associated with the selected intra prediction video coding modes, and combining the determined predictors using the determined weights.

5. The method according to claim 2, wherein the at least two intra prediction video coding modes are selected based on the gradient analysis.

6. The method according to claim 2, further comprising: discarding at least one duplicate in the selected intra prediction video coding modes.

7. The method according to claim 2, wherein a plurality of intra prediction video coding modes are selected based on the gradient analysis, the DIMD image processing method further comprising: replacing a discarded intra prediction video coding modes that was selected based on the gradient analysis, by selecting another intra prediction video coding mode based on the gradient analysis.

8. The method according to claim 2, wherein a number of intra prediction video coding modes selected based on the gradient analysis is based on a size of the current pixel block.

9. The method according to claim 2, wherein the performing the gradient analysis comprises: for at least one pixel of the application area, computing a gradient representing a directional change of an intensity at the pixel, and wherein the selecting the at least one intra prediction video coding mode based on the gradient analysis is based on at least one of the computed gradients.

10. The method according to claim 1, wherein the DIMD image processing method is performed by a processor of an image encoder of the encoder side, and further comprises, at the image encoder: encoding, via the processor, the current pixel block according to the at least one intra prediction video coding mode selected based on the gradient analysis.

11. The method according to claim 2, wherein the DIMD image processing method is performed by a processor of an image decoder of the decoder side, and further comprises, at the image decoder: decoding, via the processor, the current pixel block according to the at least one intra prediction video coding mode selected based on the gradient analysis.

12. The method according to claim 11, wherein the at least one intra prediction video coding mode selected based on the gradient analysis used at the encoder side for encoding the current pixel block is used at the decoder side for decoding the current pixel block.

13. The method according to claim 2, wherein the performing the gradient analysis further comprises: computing a first gradient value representing an estimate magnitude of the directional change of the intensity at the at least one pixel, and a second gradient value representing an estimate orientation of the directional change of the intensity at the at least one pixel.

14. The method according to claim 9, wherein the selecting the at least one intra prediction video coding mode based on the gradient analysis comprises: for the at least one pixel of the application area, mapping the computed gradient to an intra prediction mode among the plurality of intra prediction video coding modes.

15. The method according to claim 2, wherein the selecting the at least one intra prediction video coding mode based on the gradient analysis further comprises: determining respective weight values for several intra prediction modes among the plurality of intra prediction video coding modes, based on gradients computed for pixels of the application area.

16. The method according to claim 15, wherein the weight value for an intra prediction video coding mode is determined based on the one or more computed gradient mapped to the intra prediction video coding mode, and wherein at least one of the at least one intra prediction video coding mode selected based on the gradient analysis is selected based on its weight value.

17. An apparatus of an encoder side, the apparatus comprising a processor and a memory operatively coupled to the processor, wherein the processor is configured to:
perform a Derived Intra Mode at Decoder (DIMD) image processing method for processing a current pixel block of an image; and
provide, to a decoder side, control information indicating that the DIMD image processing method has been used by the encoder side for processing the current pixel block of the image,
wherein the image is divided into a plurality of pixel blocks which are processed according to a processing sequence,
and wherein the DIMD image processing method comprises, for the current pixel block of the image:
determining an application area comprising a set of pixels in blocks preceding the current pixel block in the processing sequence;
performing a gradient analysis on at least one pixel of the application area;
selecting at least two intra prediction video coding modes among a plurality of intra prediction video coding modes usable for processing the current pixel block, wherein at least one of the selected intra prediction video coding modes is selected based on the gradient analysis;
determining a plurality of predictors of the current pixel block based on the at least two selected intra prediction video coding modes; and
generating a predictor of the current pixel block based on the determined plurality of predictors.

18. An apparatus of a decoder side, the apparatus comprising a processor and a memory operatively coupled to the processor, wherein the processor is configured to:
- receive, from an encoder side, control information indicating that a Derived Intra Mode at Decoder (DIMD) image processing method has been used by the encoder side for processing a current pixel block of an image; and
- perform the DIMD image processing method for processing the current pixel block of the image;
- wherein the image is divided into a plurality of pixel blocks which are processed according to a processing sequence,
- and wherein the DIMD image processing method comprises, for the current pixel block of the image:
  - determining an application area comprising a set of pixels in blocks preceding the current pixel block in the processing sequence;
  - performing a gradient analysis on at least one pixel of the application area;
  - selecting at least two intra prediction video coding modes among a plurality of intra prediction video coding modes usable for processing the current pixel block, wherein at least one of the selected intra prediction video coding modes is selected based on the gradient analysis;
  - determining a plurality of predictors of the current pixel block based on the at least two selected intra prediction video coding modes; and
  - generating a predictor of the current pixel block based on the determined plurality of predictors.

19. A non-transitory computer-readable medium encoded with executable instructions which, when executed, causes an apparatus of an encoder side comprising a processor operatively coupled with a memory, to:
- perform a Derived Intra Mode at Decoder (DIMD) image processing method for processing a current pixel block of an image; and
- provide, to a decoder side, control information indicating that the DIMD image processing method has been used by the encoder side for processing the current pixel block of the image,
- wherein the image is divided into a plurality of pixel blocks which are processed according to a processing sequence,
- and wherein the DIMD image processing method comprises, for the current pixel block of the image:
  - determining an application area comprising a set of pixels in blocks preceding the current pixel block in the processing sequence;
  - performing a gradient analysis on at least one pixel of the application area;
  - selecting at least two intra prediction video coding modes among a plurality of intra prediction video coding modes usable for processing the current pixel block, wherein at least one of the selected intra prediction video coding modes is selected based on the gradient analysis;
  - determining a plurality of predictors of the current pixel block based on the at least two selected intra prediction video coding modes; and
  - generating a predictor of the current pixel block based on the determined plurality of predictors.

20. A non-transitory computer-readable medium encoded with executable instructions which, when executed, causes an apparatus of a decoder side comprising a processor operatively coupled with a memory, to:
- receive, from an encoder side, control information indicating that a Derived Intra Mode at Decoder (DIMD) image processing method has been used by the encoder side for processing a current pixel block of an image; and
- perform the DIMD image processing method for processing the current pixel block of the image;
- wherein the image is divided into a plurality of pixel blocks which are processed according to a processing sequence,
- and wherein the DIMD image processing method comprises, for the current pixel block of the image:
  - determining an application area comprising a set of pixels in blocks preceding the current pixel block in the processing sequence;
  - performing a gradient analysis on at least one pixel of the application area;
  - selecting at least two intra prediction video coding modes among a plurality of intra prediction video coding modes usable for processing the current pixel block, wherein at least one of the selected intra prediction video coding modes is selected based on the gradient analysis;
  - determining a plurality of predictors of the current pixel block based on the at least two selected intra prediction video coding modes; and
  - generating a predictor of the current pixel block based on the determined plurality of predictors.

* * * * *